US006506605B1

(12) United States Patent
Allen et al.

(10) Patent No.: US 6,506,605 B1
(45) Date of Patent: Jan. 14, 2003

(54) SYSTEM FOR SENSING CATALYST COATING LOSS AND EFFICIENCY

(75) Inventors: Fred Mitchell Allen, Princeton Junction, NJ (US); Xiaolin David Yang, Edison, NJ (US); Ronald Marshall Heck, Frenchtown, NJ (US); Jeffrey B. Hoke, North Brunswick, NJ (US); Earl Marvin Waterman, Iselin, NJ (US); Xinsheng Liu, Edison, NJ (US); Dennis Ray Anderson, Plainsboro, NJ (US); Arthur Bruce Robertson, Greenbelt, MD (US); Terence Christopher Poles, Ringoes, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/579,563

(22) Filed: May 26, 2000

(51) Int. Cl.[7] .................. G01N 31/10; G01N 33/20; G01N 21/27
(52) U.S. Cl. .................. 436/37; 422/119; 436/56; 436/84; 436/149; 436/164; 436/172
(58) Field of Search ............... 436/37, 56, 84, 436/149, 164, 172; 422/119

(56) References Cited

U.S. PATENT DOCUMENTS

| 3,738,088 A | 6/1973 | Colosimo |
| 3,926,558 A | * 12/1975 | Davis .................. 436/37 |
| 4,325,255 A | 4/1982 | Howard et al. |
| 4,343,776 A | 8/1982 | Carr et al. |
| 4,405,507 A | 9/1983 | Carr et al. |
| 5,051,671 A | 9/1991 | Crider et al. |
| 5,185,773 A | 2/1993 | Blossfeld et al. |
| 5,283,041 A | 2/1994 | Nguyen et al. |
| 5,340,562 A | 8/1994 | O'Young et al. |
| 5,343,146 A | 8/1994 | Koch et al. |
| 5,422,331 A | 6/1995 | Galligan et al. |
| 5,556,663 A | 9/1996 | Chang et al. |
| 5,972,714 A | 10/1999 | Roland et al. |
| 5,974,787 A | * 11/1999 | Lemire et al. ............... 60/274 |
| 5,997,831 A | * 12/1999 | Dettling et al. ............. 423/219 |
| 6,034,775 A | 3/2000 | McFarland et al. |

FOREIGN PATENT DOCUMENTS

| DE | 4007 965 A | 9/1991 |
| JP | 61168725 A | 7/1986 |
| JP | 05201245 A | 8/1993 |
| JP | 7-96135 | * 4/1995 |
| JP | 08189634 A | 7/1996 |
| JP | 11123232 A | 5/1999 |

OTHER PUBLICATIONS

S. Skledar Peintures, Pigments, Vernis 1969, 45, 783–791.*
J. P. Callinan et al, Am. Soc. Mech. Eng. 1977, 77–HT–67.*

(List continued on next page.)

Primary Examiner—Arlen Soderquist
(74) Attorney, Agent, or Firm—Russell G. Lindenfelder

(57) ABSTRACT

An OBD system is provided for monitoring an ozone depletion system that includes a catalyst coating containing $MnO_2$ applied to a heat exchange surface on a moving vehicle over which atmospheric air passes. A physical characteristic of the catalyst coating or a material containing a physical characteristic within the catalyst coating is sensed to determine the presence or absence of the catalyst coating for detecting catastrophic failure of the ozone depleting system and/or degradation or wear of the catalyst coating to ascertain the efficiency of the catalyst coating.

69 Claims, 9 Drawing Sheets

OTHER PUBLICATIONS

T. Sato et al, Natl. Tech. Rep. 1991, 37, 130–136.*

S. Dallaire et al, J. Therm. Spray Technol. 1993, 2, 363–368.*

J. Hoke et al, Soc. Automot. Eng. 1996, SP–1173 261–265.*

G. C. Koltsakis et al, Prog. Energy Combust. Sci. 1997, 23, 1–39.*

D. D. Beck Stud. Surf. Sci. Catal. 1997, 111, 21–38.*

N. Singh et al, Proceedings, Annual Meeting—Air & Waste Management Association 1997, 90th, MP4A07/1–18.*

M.–C. Wu et al, Appl. Catal. B: Environ. 1998, 18, 79–91.*

J. Hoke et al, Soc. Automot. Eng. 1999, SP–1478 146–153..*

* cited by examiner

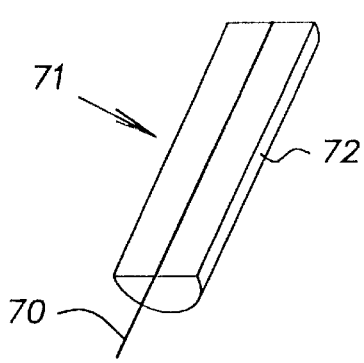 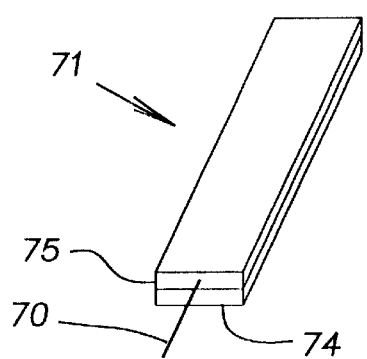
FIG.8A  FIG.8B
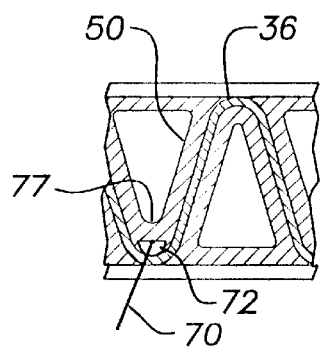 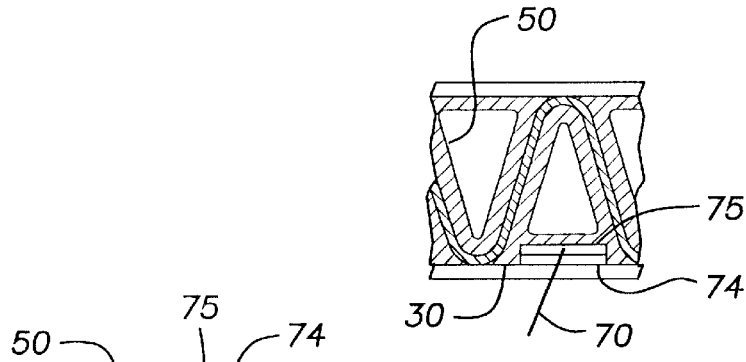
FIG.9A  FIG.9B
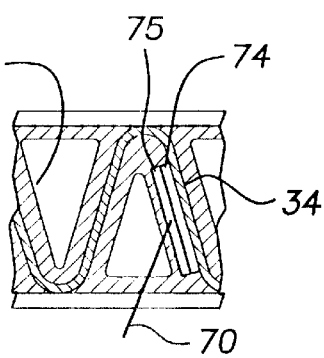
FIG.9C
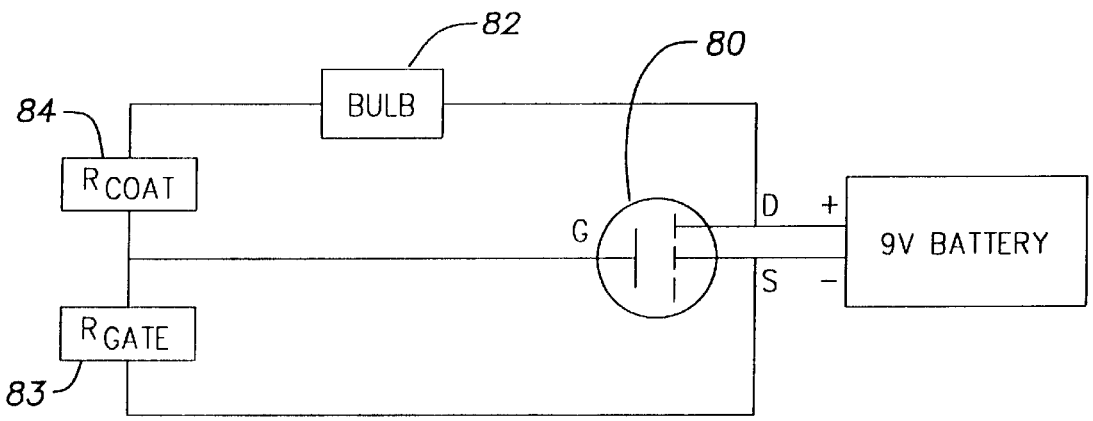
FIG.12

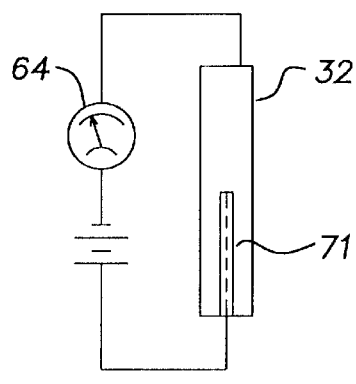
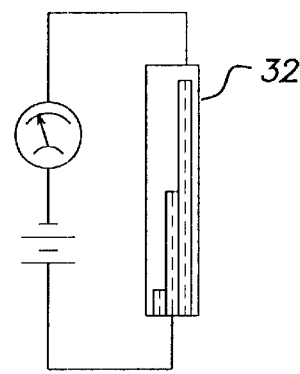
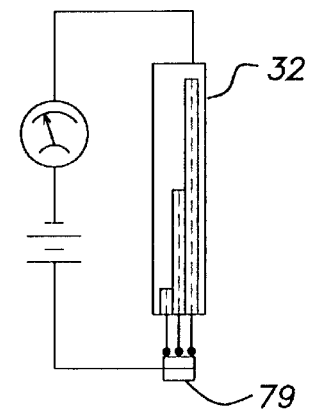
FIG. 10A    FIG. 10B    FIG. 10C
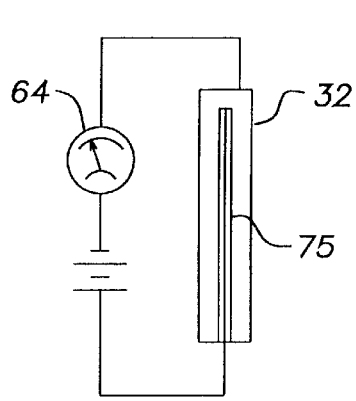
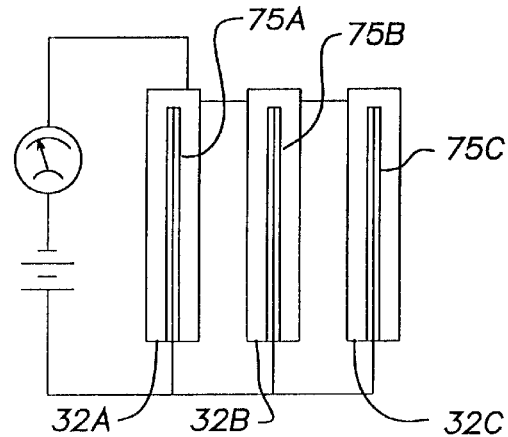
FIG. 11A    FIG. 11B
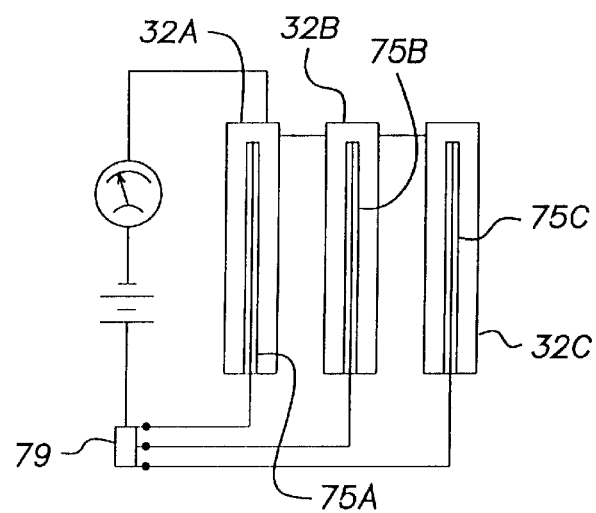
FIG. 11C

SYSTEM FOR SENSING CATALYST COATING LOSS AND EFFICIENCY

This invention relates generally to a method for determining the efficiency of a catalyst coating and more particularly to a method for determining the effectiveness of a catalyst based ozone depletion system.

The invention is particularly applicable to and will be described with specific reference to an on-board diagnostic system determining failure of an ozone depletion system applied to heat exchange surfaces in a vehicle and indicating such failure to the vehicle's operator. However, the invention is believed to have broader application and could be employed to determine the conversion efficiency of a stationary system using a catalyst based ozone depletion system such as heat exchangers or HVAC systems in residential, commercial or industrial facilities. Still further, the invention is also believed to have application to certain catalyst formulations, other than those utilized in an ozone depletion system, but which have distinguishing performance characteristics similar to those of a catalyst based ozone depletion system.

INCORPORATION BY REFERENCE

The following United States patents are incorporated by reference herein and made a part hereof:

a) U.S. Pat. No. 5,051,671 issued Sep. 24, 1991 to Crider et al. entitled "Proximity Sensor and Control";

b) U.S. Pat. No. 4,325,255 issued Apr. 20, 1982 to Howard et al. entitled "Ultrasonic Apparatus and Method for Measuring the Characteristics of Material";

c) U.S. Pat. No. 5,556,663 issued Sep. 17, 1996 to Chang et al. entitled "Excimer Fluorescence Method for Determining Cure of Coatings";

d) U.S. Pat. No. 5,343,146 issued Aug. 30, 1994 to Kock et al. entitled "Combination Coating Thickness Gauge Using a Magnetic Flux Density Sensor and an Eddy Current Search Coil";

e) U.S. Pat. No. 5,185,773 issued Feb. 9, 1993 to Blossfeld et al., entitled "Method and Apparatus for Nondestructive Selective Determination of a Metal"; and, f) U.S. Pat. No. 6,034,775 issued Mar. 7, 2000 to McFarland et al., entitled "Optical Systems and Methods for Rapid Screening of Libraries of Different Materials".

The above patents are cited so that the Detailed Description of this Invention need not recite in detail sensor apparatus and techniques known to those skilled in the art. None of the patents cited above or incorporated by reference herein form any part of the present invention.

BACKGROUND i) Catalyst Based Ozone Depletion Systems

It is known that ground-level ozone, $O_3$, is the main harmful ingredient in smog and at relatively small concentrations, ground level atmosphere is physically harmful. It is also known that ozone is produced by complex chemical reactions when its precursors such as VOC (volatile organic compounds) and NOx (nitrogen oxides) react in the presence of sunlight. The precursors mentioned are present in emissions produced from vehicles powered by internal combustion engines. The United States EPA has determined that cars and light trucks emit a substantial portion of precursors which produce ground level ozone.

The EPA, in implementing the provisions of the United States Clean Air Act, has identified 26 metropolitan areas within the United States which its modeling techniques show have or will exceed National Ambient Air Quality Standards for ozone in the near future. Accordingly, the EPA has promulgated increasingly tighter emission regulations directed to limiting emissions from vehicles which promote ozone formation.

It has been recognized for some time that a significant quantity of atmospheric air is used or drawn in by a vehicle while it is moving and that atmospheric air can be cleansed by the vehicle. For example, U.S. Pat. No. 3,738,088 to Colosimo passed a stream of atmospheric air drawn into a duct at the front of a vehicle through a filter and an electrostatic precipitator, powered electrically by the engine, which removed particulates from the atmospheric air before exhausting the cleansed air back into the atmosphere. Similar cleansing techniques have been widely used for purifying cabin air in a moving vehicle.

While there are various known ways or methods to remove or convert ozone to a benign chemical or compound, the assignee of the present invention has determined and formulated various catalyst coatings utilizing Manganese Dioxide, $MnO_2$, which has been found effective to convert ozone to oxygen ($O_3 \rightarrow 3/2 O_2$) at slightly elevated temperatures. Reference can be had to assignee's U.S. Pat. No. 5,997,831, U.S. Ser. No. 09/151,784 filed Sep. 11, 1998 and Ser. No. 09/317,723 filed May 24, 1999 for examples of catalyst coatings which contain an ozone depleting substance, principally forms of $MnO_2$, all incorporated by reference herein. Specifically, the assignee has determined that vehicles having radiators and/or air conditioning units operate at slightly elevated temperatures from ambient whereat the ozone depleting catalysts formulated by assignee are especially effective in converting ozone to oxygen while exhibiting characteristics allowing the catalyst to adhere to vibrating surfaces and function in the harsh environment that a motor vehicle is subjected to. The assignee of this invention has marketed its ozone depleting substances under its PremAir® brand name.

The environmental regulatory agencies have recognized the potential for vehicles to purify the atmosphere as well as being one of the causes of air pollution. To the extent that internal combustion engines produce emissions which cause the formation of ozone then, in principle, an offsetting "credit" should and is allowed providing that a vehicle can be shown to reduce ground level ozone present in the atmosphere. In practice this requires an on-board diagnostic (OBD) system to determine the effectiveness of the vehicle to cleanse or convert ozone in atmospheric air to a clean form, i.e., $O_2$.

Obviously, the most effective way to determine the functioning of an ozone depletion system is to measure the ozone concentration in the atmospheric air stream upstream and downstream of the ozone depletion system. The difference between the measurements provides an accurate "count" of the quantity of ozone removed from the atmospheric air stream passing through the ozone depleting system. Another type of OBD system is widely used to determine the functioning of the typical TWC catalyst (three way catalyst) for removing HC (hydrocarbons) in that oxygen sensors, upstream and downstream of the TWC catalyst, sense upstream and downstream oxygen concentrations in the exhaust gas to estimate a storage capacity of the TWC catalyst which in turn is correlated to the efficiency at which the TWC catalyst converts certain noxious emissions.

A direct ozone sensing approach will not practically function today as an OBD system to measure the effectiveness of an ozone depletion system installed on a moving vehicle for several reasons. First, the ozone concentration that is being sensed is small and variable. For example, standard regulatory limits are 0.12 ppm over one hour with proposed regulations reducing the exposure to 0.08 ppm over an 8 hour period. Even in high smog concentration areas, such as Los Angeles, ground level ozone concentration may reach 0.20 ppm during summer, daytime hours and 0.01–0.02 ppm during nightime. The ozone sensor has to therefore have a sensitivity sufficient to detect and measure minute quantities of ozone present in a moving gas stream. Second, while current ozone detectors exist that can measure ozone concentration in the range of 100 ppb, the cost of current ozone sensors (priced in the thousands of dollars and not unusually, in the ten thousand dollar range) far exceeds that acceptable for an OBD application, even given the scales of economy achieved in the automotive market. Third the physical dimensions, response time and robustness of currently available ozone sensors is simply insufficient for an OBD system. For example many ozone sensors use a two step process of measuring light absorption through transmission measurements in an ozone free reference sample compared to an extracted ambient atmosphere sample to determine ozone concentration. Typically the detector requires a warm-up time and the sample volume is relatively large (although hand held) etc. Improvements are being made in such sensors. For example, U.S. Pat. No. 5,972,714 to Roland et al. discloses an ozone sensor measuring microcracks caused in an elastomeric material to determine the presence of ozone at sampling times in the range of 10–15 minutes. While a definite improvement, such sensor would not function as an OBD detector in the automotive environment.

ii) Sensors

The sensor art is a developed and refined field applied in any number of applications. In U.S. Pat. No. 4,325,255 ultrasonic impedance is measured to determine characteristics of a material including the density of the material, the level of material in a container, interface position between materials of different density, material hardness, particle and changes in chemical composition such as changes in physical/chemical characteristics i.e, density used to monitor the curing of resins, concrete and similar materials. In U.S. Pat. No. 5,051,671 a proximity sensor utilizing a capacitor determines the presence or absence of a material. In U.S. Pat. No. 5,556,663 a fluorophore is added to or chemically attached to a curable release coating applied to a substrate and exposed to an ultraviolet light source to monitor the cure of coated substrates such as silicone release liners. In U.S. Pat. No. 5,343,146 magnetic flux densities utilizing eddy current effects are sensed to measure coating-thickness for both nonferrous coatings on ferrous substrate and nonconductive coatings on conductive nonferrous substrate. In U.S. Pat. No. 6,034,775 optical or luminescence systems, principally polarized light, is used to screen a catalyst array located at defined regions on a substrate for use in synthesized combinatorial chemistry methods by varying the light intensity. In U.S. Pat. No. 5,185,773 an x-ray technique fluorescing lead with gadolinium (Gd-153) and sensing attenuation of the rays is used to nondestructively test the substrate of a catalytic converter to determine the amount of platinum present, including zero, on the converter substrate in a single pass. Generally, a number of the mentioned prior art sensors and systems are not of the type that can be readily implemented in or are suitable for inclusion on a vehicle as an OBD system. i.e., x-ray attenuation measurements. Many of the sensor systems are active, particularly the curing arrangements, in that a chemical reaction is forced to occur which results in a sudden physical change in state that is detected. That is the sensors disclosed are not shown or disclosed as suitable for use in a method whereat the sensor is detecting a physical aging characteristic of the catalyst correlated to a chemical active state of the catalyst or a method whereat a physical wearing away of the catalyst is detected relative to a normally aged chemical condition of the catalyst.

SUMMARY OF THE INVENTION

Accordingly it is a principle object of the invention to provide an indirect sensor system which determines if a catalyst applied to a substrate is functioning as the catalyst ages.

This object along with other features and advantages of the invention is broadly achieved in a method for determining the catalytic activity of a catalyst applied to a substrate over which a stream of fluid (liquid or gas) contacting the catalyst flows. The method includes the steps or acts of a) providing a sensor generating signals indicative of a physical characteristic of the catalyst; b) setting a threshold against which the sensor signals are compared, the threshold indicative of the chemical conversion efficiency at which the catalyst reacts with the fluid stream when the catalyst normally ages to approach a steady state conversion efficiency; c) determining from the deviation between the sensor signal and the threshold signal when the sensor signal drops below the threshold signal the quantity of catalyst present on the substrate; and d)activating a warning when the quantity of catalyst present, as determined in step (c) drops below a set value. By using one sensor signal to sequentially detect both a chemical and physical condition of the catalyst, the method is able to discern when the catalyst has aged to an unacceptable condition.

In accordance with an important object of the invention a method or system is provided for determining if a vehicular ozone depletion system is functioning to remove ozone from atmospheric air. The ozone depletion system includes a catalyst containing $MnO_2$ applied as a coating to a heat exchange surface in the vehicle over which atmospheric air passes. The method includes the steps of:

a) sensing the presence of the $MnO_2$ coating on the heat exchange surface and b) activating an alarm in the vehicle when the catalyst is no longer present on the heat exchange surface.

In accordance with another important feature of the invention, the method includes the step of sensing a physical characteristic of the catalyst coating to determine i) not only its presence or absence from the heat exchange surface to determine a nonfunctioning ozone depletion system, but ii), optionally, or in addition, the relative efficiency of the ozone depletion system to convert ozone to a benign chemical or compound to determine a catastrophic failure of the ozone depletion system.

In accordance with another general feature of the invention, the sensing step includes sensing a physical characteristic of the catalyst coating selected from the group consisting of electrical conductivity, radiation absorption, radiation emission and radiation transmission whereby optical, electrical and combined optical and electrical OBD systems can be constructed to determine whether an ozone removal system based on a catalyst coating is functioning and/or measure the efficiency of the ozone removal system.

In accordance with a more specific feature of the invention, the sensing step includes the steps of providing an electrical power supply; connecting the power supply to an electrical circuit extending through a portion of the catalyst coating to cause electrons to flow through a portion of the catalyst coating when the power supply is activated; and, sensing a change or an absolute value in one or more circuit parameters selected from the group consisting of voltage, resistance or current to determine when the catalyst coating is no longer present.

In accordance with a more specific feature of the invention, a method is provided for determining when a catalyst coating containing $MnO_2$ applied as a thin layer to the fins of a vehicular radiator ceases to remove ozone from atmospheric air passing through the radiator during the life of the radiator. The method includes the steps of providing an insulated conductor having insulation partially removed over an exposed section. The insulated conductor is embedded within the catalyst coating so that the conductor insulation is in contact with (or closely adjacent to) a radiator fin and the exposed portion of the conductor section is embedded within and contacts only the catalyst coating. An electrical power source is connected between the insulated conductor and the radiator so that an electrical circuit extends from the power source through the electrical conductor and catalyst coating to the radiator. The electrical circuit is then sensed to determine when a set change in a circuit characteristic i.e., voltage, resistance or current, occurs in which instance, a warning signal is outputted.

In accordance with another aspect of the invention, the general sensing step in the general method described above further includes the steps of providing a light source and a light detector adjacent to the front or back face of the radiator. The method further includes the steps of directing light from the light sensor against at least a portion of the radiator having the coating applied thereto when the radiator was new (or rebuilt) and sensing the incident light from the light source after it strikes the radiator by the light detector. The method then determines if the intensity of the signal outputted from the light detector is within a given range which in the first instance corresponds to the absence of the catalyst coating on the sensed portion of the radiator so that an alarm within the vehicle can be activated.

In accordance with an important aspect of the invention, the set range may also correspond to a set efficiency percentage at which the catalyst coating removes ozone and encompasses an efficiency reduction caused by a wear factor selected from the group consisting of i) a loss of catalyst coating on the radiator; ii) a poisoning of catalyst coating by contaminant deposits; and, iii) a poisoning of the catalyst coating by contaminant deposits in combination with a loss of catalyst coating.

In accordance with another aspect of the invention, the light source is an LED emitting visible or near infra-red light incident to a number of fins and the detector is an inexpensive photodiode sensing reflected light resulting in an averaged signal for a number of sensed radiator fins whereby an inexpensive OBD system results that is somewhat insensitive to a localized failure which could otherwise result in false readings.

In accordance with yet another aspect of the invention, the method includes the step of adding a marker to the catalyst coating to enhance sensed physical characteristics of the catalyst coating. Preferably, the marker includes a tag added to and uniformly dispersed within the catalytic coating when formulating the catalytic coating. In the electrical system, the marker can include various metallic particles enhancing the electrical conductivity of the circuit through the catalyst coating. In the optical system, the marker can include various phosphors and light absorbing material within specific wavelengths such as material absorbing light near the IR range to detect the presence or absence of the catalyst coating from the radiator. Still further, the tag can include heat activated radiation emission (thermochrome) substances, the detection of which insures that the catalyst coating is present on the radiator. Alternatively, the marker could include an optically reflective or electrically conductive strip applied between the heat exchanger and the catalyst coating providing signature detector signals should the catalyst coating be removed from the heat exchanger surface. The strip has specific application to installations where the heat exchanger surface is not an aluminum or brazed aluminum material which is highly electrically conductive and optically reflective.

It is a general object of the invention to determine when the efficiency of an aged catalyst applied as a coating on a substrate has dropped below an acceptable level.

It is another object of the invention to physically sense a characteristic of a catalyst coating applied to a heat exchange surface in an ozone depletion system to determine the efficiency of the system to deplete ozone from a gas passing over the catalyst coating.

It is an object of the invention to sense the presence or absence of a catalyst coating to determine if an ozone depleting system is functioning to remove ozone from a gas passing over the catalyst coating.

A specific object of the invention is to provide a system which determines the presence of a catalyst coating or the efficiency of an aged catalyst coating by monitoring response of changes in physical characteristics of the catalyst coating as a result of changes in temperature, i.e., a marker added to the coating that changes color with heat or the loss of moisture from the catalyst and its effect on electrical measurements, e.g. decrease with resistance on heating.

Yet another object of the invention is to formulate an ozone depleting catalyst with a material having physical properties that can be detected by a sensor to determine the functioning and/or efficiency of an ozone depleting system.

Another object of the invention is to provide an OBD system for vehicular application using passive sensing techniques to determine when a catalyst coating applied to a substrate has exceeded a normal, aged steady-state conversion efficiency.

Still another object of the invention is to provide a detector system for determining whether a stationary or vehicular ozone depletion system is functioning.

A more specific object of the invention is to provide an OBD system which senses an electrical characteristic of an ozone depleting catalyst coating applied to a heat exchange surface on a moving vehicle to determine if the catalyst coating is functioning to remove ozone and/or the efficiency of the catalyst coating to remove ozone from air passing over the catalyst coating.

Yet another specific object of the invention is to provide an OBD system which senses a radiation characteristic of an ozone depleting catalyst coating applied to a heat exchange surface on a moving vehicle to determine if the catalyst coating is functioning to remove ozone and/or the efficiency of the catalyst coating to remove ozone from air passing over the catalyst coating.

Still yet another object of the invention is to provide an indirect sensing OBD system which determines the functioning and/or efficiency of an ozone depletion system applied to a moving vehicle which is inexpensive and robust.

A still further object of the invention is to provide an indirect measuring OBD system monitoring the functioning of an ozone depletion system at sensitivities correlated to ozone depletion measurements in the range of 100 ppb.

BRIEF DESCRIPTION OF THE DRAWINGS

The invention may take form in certain parts and an arrangement of parts taken together in conjunction with the attached drawings which form a part hereof and wherein:

FIGS. 8A and 8B are schematic portrayals of an electrical conductor used in the electrical OBD sensor of the present invention;

FIGS. 9A, 9B and 9C are schematic representations of various position placements in the catalyst coating for the electrical conductors illustrated in FIGS. 8A and 8B;

FIGS. 10A, 10B and 10C schematically illustrate various positions of single wire placements in a radiator fin row for an electrical OBD sensor of the invention;

FIGS. 11A, 11B and 11C illustrate various arrangements for conductive strip circuit measurements for an electrical OBD sensor;

FIG. 12 is a general schematic of an OBD circuit used in the electrical OBD sensors of the present invention;

DETAILED DESCRIPTION OF THE INVENTION

Figure 1:
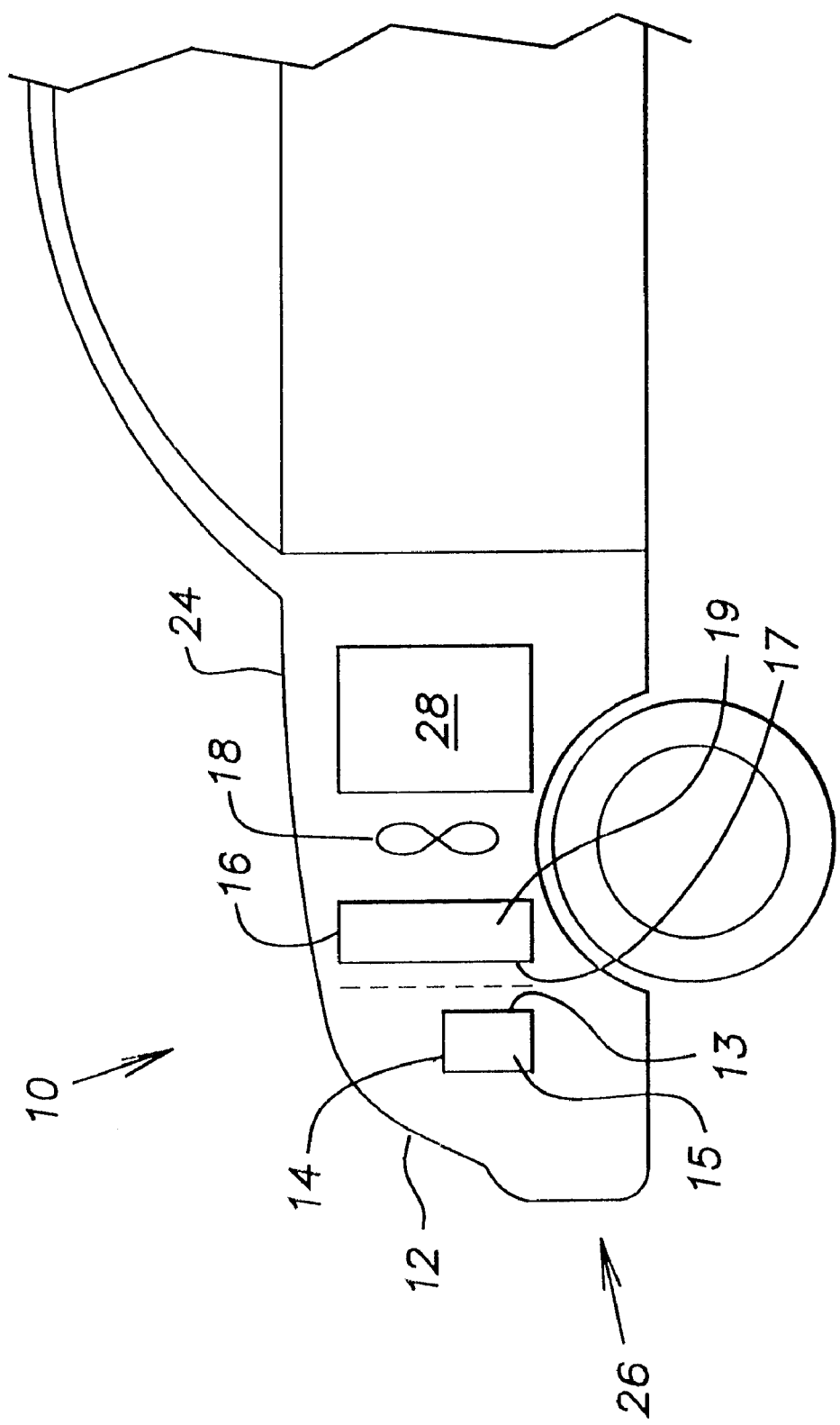
FIG. 1 is a schematic view of a vehicle showing a grille, air conditioner condenser, radiator, fan and engine.

Referring now to the drawings wherein the showings are for the purpose of illustrating a preferred and alternative embodiments of the invention and not for the purpose of limiting the same, there is shown in FIG. 1 a vehicle 10 which includes a grille 12, an air conditioner condenser 14, a radiator 16 and a radiator fan 18. The air conditioner condenser 14 and radiator 16 are examples of devices present within vehicle 10 that contain heat exchange surfaces upon which is applied an ozone depleting substance.

A) The Ozone Depletion System

For definitional purposes and as used in this Detailed Description and in the claims, the term "ozone depleting system" means a system containing an "ozone depleting catalyst" or "catalyst coating" applied to a "heat exchange surface" (as hereinafter defined). The terms "catalyst coating" and "ozone depleting catalyst" are used interchangeably and, in a general sense, mean any composition, material, compound and the like that removes ozone from a gas (containing ozone) including by way of non-limiting examples, catalyst compositions, adsorbent compositions, absorbent compositions, polymeric compositions and the like. Specifically, and as used in this invention, "ozone depleting catalyst" or "catalyst coating " includes a composition, material, compound and the like that contains, at least as one of its elements, manganese in oxide form, such as, but not limited to, the various manganese compounds set forth below applied to or even comprising a heat exchange surface of a heat exchange device. The "catalyst coating" or "ozone depleting catalyst" terminology can include in its formulation the addition of signal enhancing or generating elements, as defined further below, even though such elements may make no contribution to the ozone depleting characteristics of the catalyst. In the preferred embodiment of this invention, the catalyst coating is assignee's catalytic material sold under assignee's brand name "PremAir"®. "Heat exchange device" is used in its customary broad sense to include devices which treat fluids, gases or liquids, by increasing or decreasing the temperature of an incoming stream. "Heat exchange surface" means a surface associated with a heat exchange device over which a gas stream containing ozone, typically atmospheric air, passes. The heat exchange surface is typically at an elevated temperature over ambient (i.e., about 90° C. or higher) at which temperature the catalyst coating is catalytically effective to remove ozone, preferably by converting ozone to oxygen through the reaction of $O_3 \rightarrow 3/2\ O_2$. It is to be appreciated that the conversion efficiency of the catalyst coating increases with increasing temperature so that a specific temperature at which the catalyst coating is effective to remove ozone cannot be stated. Generally speaking the catalyst coatings as set forth in detail below have conversion efficiencies of between about 50 to 100% at temperatures of about 25 to 200° C.

The catalyst coating is applied as a coating to the heat exchange surface typically through dipping or spraying techniques. Preferably, the catalyst is applied as a "high surface area" coating meaning that the surface area of the catalyst coating is at least about 100 $m^2$/g and more preferably in the range of about 100 to 300 $m^2$/g. As a general reference base, the coating thickness is about that of paint, typically between about 10 to 30 $\mu$m with an average thickness of about 20 $\mu$m. It is important to note that the thickness of the ozone depleting substance cannot be of a magnitude which interferes with the air flow (pressure drop) and heat exchanging properties of the heat exchange surface to which it is applied.

In operation, atmospheric air is drawn or forced over the ozone depleting substance by natural wind currents formed by a moving vehicle or by air drawing devices such as fans employed in the vehicle. In land use vehicles ("vehicle" in its broad sense encompasses cars, trucks, buses, motorcycles, trains, boats, ships, airplanes, dirigibles, balloons and the like) the heat exchange surfaces are preferably surfaces typically located toward the front of the vehicle that catch air during vehicle motion and are in the vicinity of the cooling fan. Useful heat exchange surfaces include surfaces of the radiator and air conditioning condenser and the like which are all located and supported within the housing of the vehicle.

Referring still to FIG. 1, heat exchange surfaces can include the face 13 and side 15 surfaces of air conditioning condenser 14 and face 17 and side 19 surfaces of radiator 16. These surfaces are located within the housing 24 of vehicle 10 and are typically under the hood of vehicle 10 between the front 26 of the vehicle and the engine 28.

Figure 2:
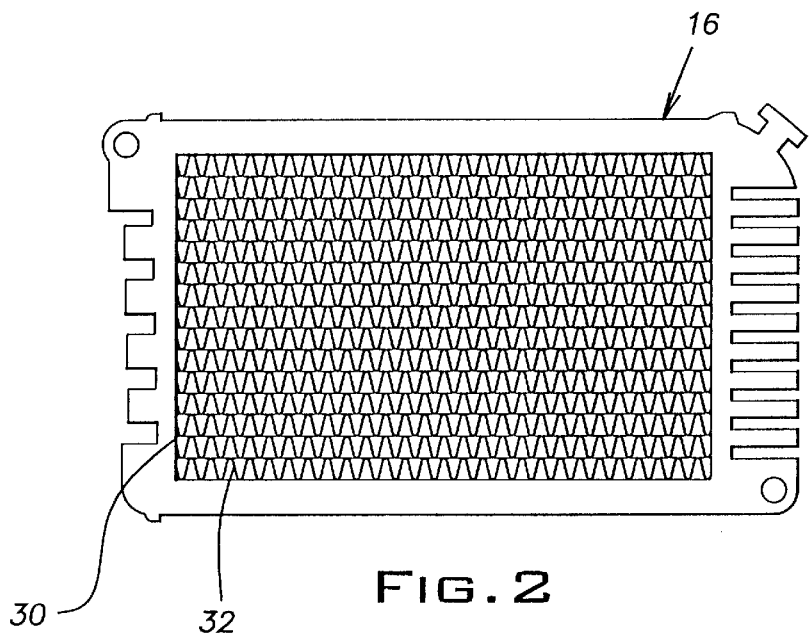
FIG. 2 is a front view of a radiator with horizontal tubes and fin rows.
Figure 3:
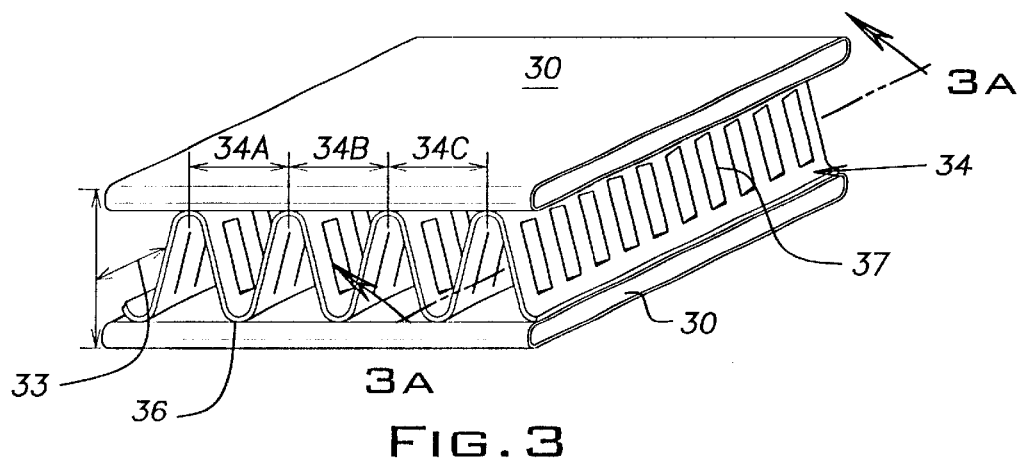
FIG. 3 is a perspective view of a portion of a radiator fin row between radiator tube portions.
Figure 3A:
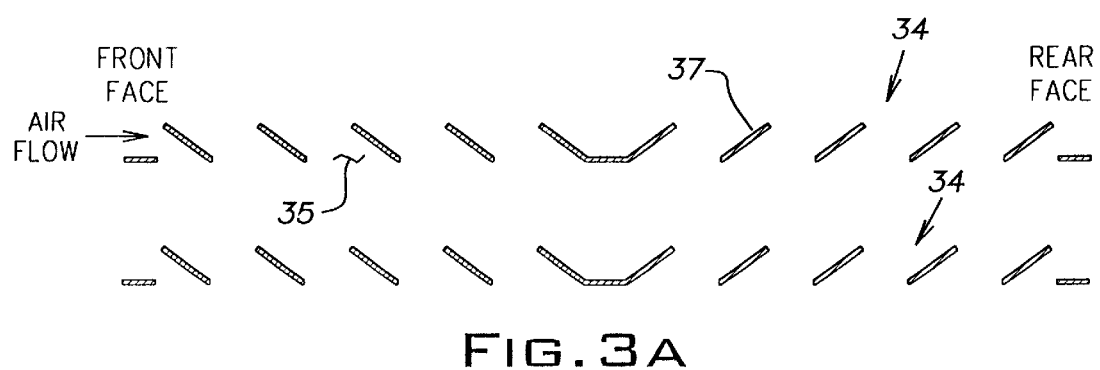
FIG. 3A is a sectioned view of a portion of the radiator fin taken along lines 3A—3A of FIG. 3.

In the preferred embodiment of this invention, the heat exchange device is a radiator in a moving vehicle, typically, a brazed aluminum radiator as shown in FIGS. 2, 3 and 3A. As is well known, a liquid coolant, typically antifreeze, travels within a series of generally parallel, spaced tubes 30 from one end of the radiator (an inlet typically at the top or bottom of radiator 16) to the other end of the radiator (an outlet, typically at the bottom or top of radiator 16). In FIG. 2, the tubes are oriented to extend horizontally across the radiator face. Alternatively, a common construction is to have tubes 30 extend vertically. Tube orientation is not a limitation to the invention, but is a factor which is to be considered. Within the open space between adjacent tubes is positioned a sheet of corrugated thin aluminum or aluminum foil. A If channel 33 is defined as the open space running from the front to the back face of the radiator between adjacent corrugations.

For consistency in terminology, the corrugated sheet will be referred to as a fin row 32 and each half corrugation within the fin row will be defined as a radiator fin 34, fins 34A, 34B, 34C, being designated in FIG. 3. Fin spacing is defined as corrugations per inch and the depth of the channel. The grooves or ridges 36 of the corrugations are brazed within channel 33 to tubes 30. It is to be noted that the flux for brazing is typically a potassium/aluminum/fluoride substance (K Al F) commonly known by the brand name Nocolok (available from Omni Technologies Corp.) which is deposited over confronting tubular surfaces in channels 33 and covers the aluminum surface of tubes 30 and fins 34. Each fin 34 extends the length of channel 33 as shown in FIG. 3 and typically each fin 34 and channel length is about 0.5" to 2.0". Further, to enhance the cooling efficiency of fins 34, each fin is typically slotted at 35 to form louvers 37 as shown in FIGS. 3 and 3A. It is or should be appreciated that the catalyst coating applied to radiator fins 34 cannot block louvers 37 nor materially increase the gauge thickness of fins 34 to impact the air flow (pressure drop) or heat conductability of fins 34. Accordingly, for purposes of this invention, it is to be recognized that the catalyst coating thickness is to be kept at a minimum.

Significantly, the thickness of the coating and the heat exchange surface to which the catalyst coating is applied affects the adhesion characteristic of the coating and its ability to withstand motor vehicle vibrations to which the fins are inherently subjected. The formulations of the ozone depleting catalyst, set forth below, have been found to exhibit excellent adhesion properties when applied directly to an aluminum or brazed aluminum surface as compared to other surfaces. Balancing, in a sense, the desired adhesion of the catalyst coating without adversely affecting the air flow and heat transfer characteristics of the radiator fins, it has been determined that catalyst coating thicknesses of about 10–30 $\mu$m (approximately 20 $\mu$m average) are acceptable for aluminum radiators. Other heat exchange surfaces may require the addition of a substrate coating on which the catalyst coating is applied or the catalyst coating formulation may change to provide an adhesive component to the catalyst.

B) The Inventive Methodology

As noted in the Background, the efficiency of the ozone depleting system discussed above can be directly measured by sensing the ozone concentration in atmospheric air upstream and downstream of the heat exchange surface coated with the ozone depleting catalyst. In fact, such measurements are used to obtain the test data upon which the invention of this patent is based and to certify the catalyst coated radiator as an ozone depleting system. However, to determine whether an ozone depleting system on a moving vehicle is functioning requires an ozone detector having a sensitivity to distinguish variations in ozone concentrations down to 1 to 10 parts per billion. This results because of ozone variation within the atmosphere. Most often the ozone concentration may be in the range of 100 to 200 ppb. A sensing system thus has to have a sensitivity of at least 10 ppb to determine if a failure in the ozone depleting system has occurred. As noted in the Background, laboratory and even hand held field ozone detectors possess this sensitivity, but they are not practical for installation and use in a moving vehicle.

The efficiency of the ozone depleting substance to decompose ozone to oxygen in the motor vehicle application of the invention depends on several factors, including i) the concentration of ozone in atmospheric air, ii) the accessibility of the ozone to active sites on the surface of the catalytic material, iii) the operating temperature that controls catalytic activity of the ozone depleting catalyst and iv) the amount of atmospheric air that passes over the catalyst coated on the radiator surface. (That is the air flow rate is related to contact time of an ozone molecule with the active sites on a catalyst's surface.) The physical and chemical properties of the catalyst and engineering design considerations of the coated radiator are also important considerations that affect decomposition efficiency.

B1) The Correlation between Catalyst Conversion and Catalyst Property

After tens of thousands of miles (per vehicle) of on-road use of radiators coated with PremAir catalysts of different formulations, it has been concluded that two factors are linked to catalyst accessibility as the catalyst coated radiator encompasses large volumes of air which result in aging of the catalyst.

The principal factor which has been found to affect the conversion efficiency of the catalyst coating is external matter, referred to as airborne particulate matter, to which the radiator is exposed. It is possible for such external matter to be deposited on the active sites of the catalyst and block the catalyst sites, physically or chemically. Physically, it is potentially possible to simply block the sites so that atmospheric air can not catalytically react with the active sites. Chemically, it is potentially possible to chemically poison the sites by introducing new compounds or altering the catalyst surface structure.

It is important to make a distinction between temporary blockages and localized failures attributed to external matter as contrasted to external matter which adheres to or becomes embedded in the catalyst coating on a wide spread basis. The latter will hereinafter be referred to as "contaminant deposits". It is well known, for example, that the presence of water on the catalyzed coating or very high moisture air, such as encountered in fog or mist, will adversely affect the ozone depletion system. However, this occurs only when the catalyst is wet or when the vehicle is operated at times of impending rain. When dry, the reactivity of the catalyst is restored. Accordingly, the OBD system of the present invention may provide an interlock which can be keyed to a moisture sensor or to the actuation of the vehicle's windshield wipers to simply deactivate the system during the time the vehicle is operating in the rain or when the air is at excessively high moisture levels. Stones and foreign objects impact the radiator during vehicle operation resulting in localized damage to any fin row and obviously the catalyst coating on the fin row in that localized area. However, the coating on the remainder of the radiator is not affected and the system is still operative to remove ozone from atmospheric air. Because of the tight fin row spacing it is not possible for a person to inadvertently wipe away any significant amount of the catalyst coating on a "system" basis while servicing or attending the radiator. It is also potentially possible for mud to be lodged into the radiator and conceivably, a vehicle could splash through a number of puddles such that the entire radiator becomes clogged with mud (although this has not been observed in practice). As noted, the OBD system is not activated during the "wet" mud deposition stage. When subsequently activated (during the dry condition), it is believed that should mud be caked onto the radiator to the extent that the catalytic material was rendered inactive, then the radiator would be clogged to the point where the vehicle would overheat. Insofar as this invention is concerned, temporary failures of the ozone depletion system and localized failures not affecting overall system efficiency are not accounted for in the inventive OBD ozone depletion sensors disclosed herein.

What has been observed however is that, with thousands of miles of age per vehicle, the catalyst surface can contain deposits of ambient airborne particulates less than 10 $\mu$m in size (<$PM_{10}$) and contaminant phases foreign road matter, principally in the form of salts (carbonates, nitrates, sulfates, chlorides) which contain elements such as C, N, O, Na, Mg, Al, Si, S, K and Ca. The presence of these chemical contaminants, i.e., contaminant deposits, occurring over time in the catalyst coating and ambient <$PM_{10}$ is believed to be the principal reason which adversely affects the efficiency of the catalyst coating. However, the presence of such road contaminants hereinafter referred to as "contaminant deposits" i.e., ambient <$PM_{10}$ and contaminant deposits, has not been observed to prevent the catalytic coating from operating to remove ozone although at reduced conversion efficiencies.

Figure 4:
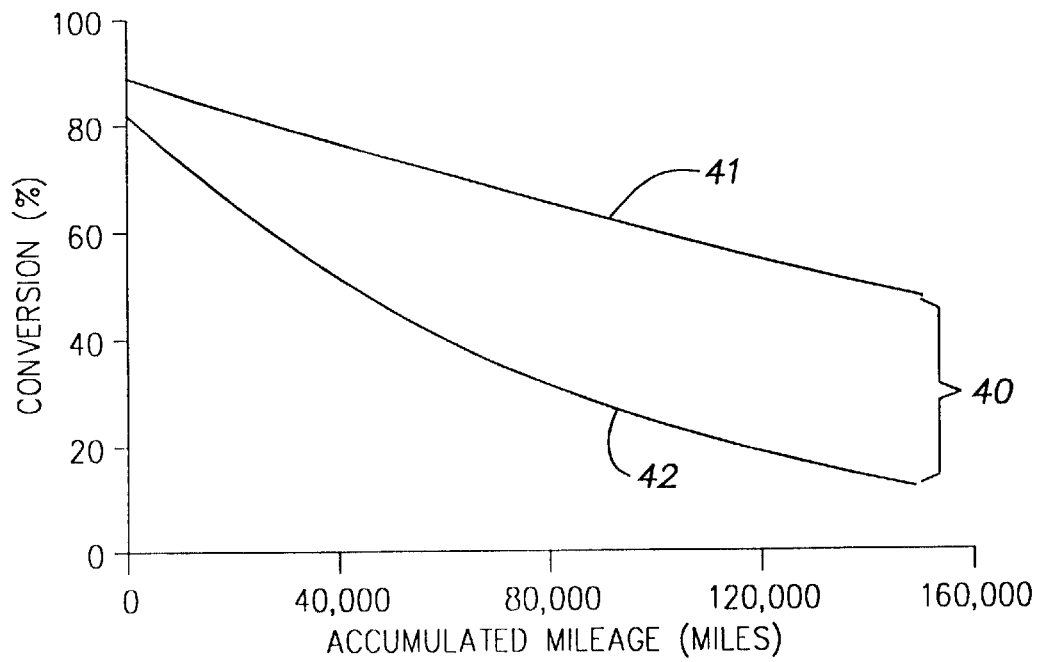
FIG. 4 is a graph of the reduction in conversion efficiency of various ozone depleting compositions as a function of accumulated mileage on a vehicle.

Reference can now be had to FIG. 4 which is an actual plot of the ozone conversion efficiency of a number of radiators treated with a variety of various catalyst coatings for vehicles driven the miles shown on the x-axis. The conversion efficiency is shown as a band designated by reference numeral 40 extending between an upper trace 41 and a lower trace 42 because several different formulations of catalysts forming the catalyst coating were investigated. Any particular formulation of catalyst coating would be depicted by a curve falling within band 40. Band 40 shows that the efficiency of the ozone depleting substance, no matter what its composition, drops as the catalyst ages but the catalyst coating still remains effective in depleting ozone, although at a reduced efficiency.

Because contaminant deposits, per se, cannot cause the ozone depletion system to become nonfunctional, the ozone depletion system can only cease to remove ozone from atmospheric air only when the catalyst coating is no longer present on the radiator. It is to be appreciated that the catalyst coating is exposed, over time, to large volumetric flows of atmospheric air containing any number of particulates which strike the thin catalyst coating and can physically erode, ablate or spall the catalyst coating. Complete wearing away of the catalyst coating during on-road road aging has never been observed.

Figure 5A:
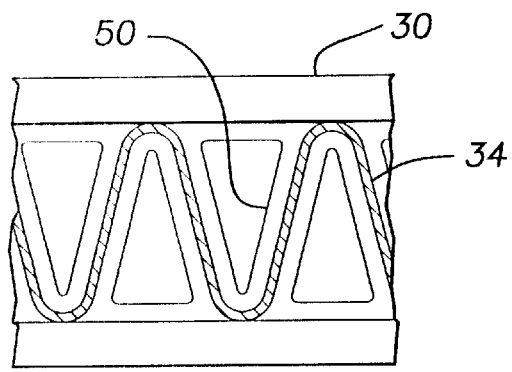
FIG. 5A is a schematic end view of a corrugated radiator strip with the catalytic coating applied.
Figure 5B:
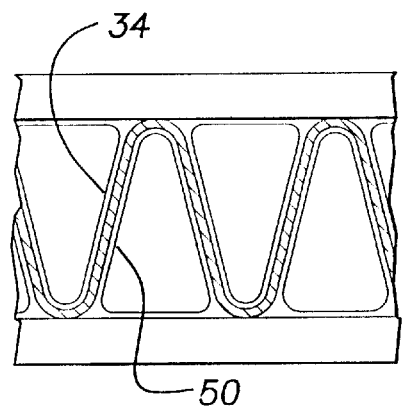
FIGS. 5B and 5C are schematic views similar to FIG. 5A showing potential wear patterns of the catalyst coating.
Figure 5C:
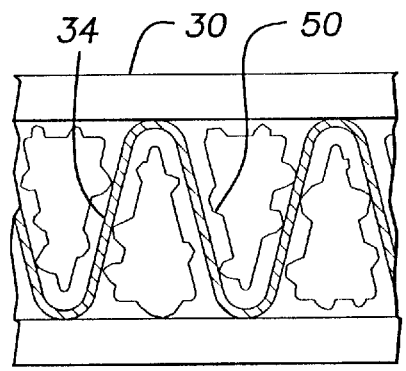

While not wishing to be bound to any specific operating theories (because the inventive OBD sensors described below function to measure the ability of the ozone depletion system to deplete ozone, notwithstanding the application of any theory), nevertheless, for discussion purposes, wearing away of the catalyst coating can occur in several ways. Reference can now be had to FIG. 5A which shows a fresh catalyst coating 50 uniformly applied to the surfaces of fins 34. Note the catalyst coating 50 is also applied to tubes 30. It is possible for catalyst coating 50 to simply be reduced in thickness as it is struck by atmospheric air flow until it thins to the point where the catalyst coating efficiency is adversely affected and eventually is gone or removed so that the ozone depleting system is no longer functional. This type of wear, referred to herein as "homogeneous", is schematically depicted in FIG. 5B. A more likely depiction of catalyst coating loss is depicted in FIG. 5C. In FIG. 5C portions of catalyst coating 50 are chipped, gouged, flaked or broken away revealing the fin surface (i.e., substrate). As the flaking increases, the coating area of the catalyst coating becomes reduced diminishing the efficiency of the catalyst coating until the exposed substrate area increases to a point whereat the ozone depletion system is no longer functional. This type of wear characterized by flaking of the catalyst coating will be referred to herein as "heterogeneous" wear. It is, of course, possible for a combination of heterogeneous and homogeneous wear to occur.

Figure 6A:
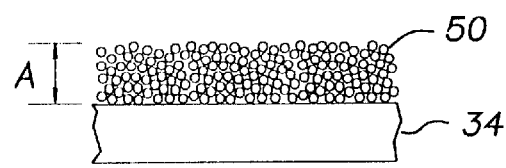
FIG. 6A is a microscopic portrayal of the catalyst coating applied to a radiator fin.
Figure 6B:
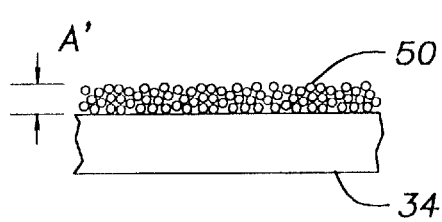
FIGS. 6B and 6C are portrayals similar to FIG. 6 showing potential wear patterns of the catalyst coating without the presence of contaminant deposits.
Figure 6C:
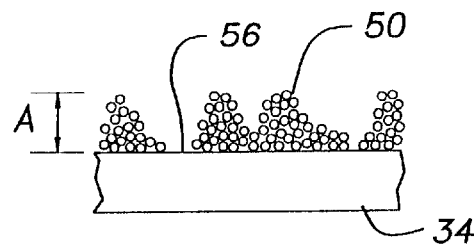

A microscopic portrayal of the wear is schematically represented in FIGS. 6A, 6B and 6C. In FIG. 6A, the $MnO_2$ particles in the catalyst coating are shown freshly applied to aluminum fin 34 (coated with K—Al—F brazing flux). The $MnO_2$ particles designated by reference numeral 55 are somewhat spherical with diameters or thicknesses of anywhere between about 0.1 to 25 $\mu$m. The $MnO_2$ particles are literally packed until reaching desired catalyst coating thickness, i.e., an average of 20 $\mu$m, shown by reference dimension "A". FIG. 6B depicts the homogeneous thinning of the catalyst coating discussed with reference to FIG. 5B. The homogeneous thinning may simply result in a removal of $MnO_2$ particles or reduction in $MnO_2$ particle size or a combination thereof shown by reference dimension "A'". FIG. 6C illustrates the heterogeneous wear discussed with reference to catalyst coating 50. The exposed fin row or tube area designated by reference numeral 56 results in an efficiency loss which eventually increases to the point where the catalyst coating is removed resulting in a nonfunctional ozone depletion system.

Proposed emission regulations extend a credit for an ozone depleting system so long as an on board detector can sense whether the system is functioning at any efficiency to reduce ozone. In such instance, FIG. 4 shows that wear resulting from normal contaminant deposits cannot prevent the ozone depletion system from functioning at some efficiency level to deplete ozone. The ozone depletion system ceases to function only when the catalyst coating has been removed to an extent that the catalyst coating is for all intent and purposes eliminated. This can occur, although rarely, when the catalyst coating physically wears away as explained in the discussion of FIGS. 5 and 6. According to this aspect of the invention, an OBD detector is constructed as described below which measures the presence or absence of the catalyst coating by detecting a physical characteristic as property of the catalyst coating. If the catalyst coating property or characteristic is not detected, the ozone depletion system is no longer functional and a warning is triggered to the operator.

From the foregoing discussion, however, it should be recognized that, as a practical matter, it is simply not possible for the catalyst to wear away completely from the radiator. There will always be some catalyst coating somewhere on a coated radiator which will allow the ozone depletion system to function at some insignificant percentage of ozone conversion. An ozone depletion system when applied to a radiator is certified at a conversion percentage by tests measuring ozone conversion of atmospheric air passing through the radiator at strategic locations whereat ozone sensors are placed in laboratory tests. By measuring ozone concentrations before and after passing through the radiator at strategic radiator locations, the ozone depletion system is certified. As will be explained below, the sensors of the invention measuring catalyst activity of ozone catalysts will be similarly strategically positioned. Should the sensors at such positions indicate the catalyst coating has worn away, then the assumption (based on the certification procedures) is that the ozone depletion system is no longer functioning to remove ozone although in reality and in all likelihood some catalyst coating is present to allow some insignificant conversion percentage of ozone. As a matter of definition and as used in the Detailed Description and in the claims, when the ozone depletion system or the catalyst coating applied to the radiator is deemed to be "nonfunctional" or "nonfunctioning" or no longer effective to remove ozone, the term and the meaning ascribed to the terminology is in its relative sense as described and not in a strict absolute sense.

Contemplated emission regulations also propose a greater emission "credit" if the OBD detector can ascertain when the efficiency of the ozone depletion system has been reduced to a set level. This set level of efficiency reduction is defined herein as a "threshold failure". For purposes of explanation of the invention, the threshold failure can be defined to occur at any reduced ozone conversion percentage, i.e., 60%, 50%, 40%, 30%, etc. For discussion purposes, the catalyst coating will be assumed to have an ozone depletion efficiency of 80% when fresh and a normal deactivation is defined to occur when the ozone depletion efficiency drops to 50%. It is possible to formulate a catalyst coating (one of the formulations making up band 40 in FIG. 4) which will not drop in efficiency less than 50% because of degradation from contaminant deposits. Threshold failure occurs then only if some portion of the catalyst coating wears away (i.e., FIGS. 5 and 6). It is important to recognize that a threshold failure can theoretically occur by wear of a fresh catalyst coating before or during the time the catalyst coating ages with contaminant deposits as well as wear of an aged catalyst coating that has somewhat stabilized in its ability to deplete ozone attributed to contaminant deposits. As will be explained below, this invention measures a physical characteristic of the catalyst coating to determine when the ozone depletion efficiency of the catalyst coating drops below the threshold failure level which is defined as approximately 50% or more of the certified ozone depletion efficiency (for specific vehicles) after long term mileage accumulation.

B2) The Measurement of the Catalyst Properties

This invention, in its broad sense, constructs an OBD detector to detect a catalyst coating physical characteristic or attribute to indirectly determine whether the catalyst coating ceases to function to remove ozone because of the absence of the catalyst coating. In another sense, this invention constructs an OBD detector that measures a physical characteristic or attribute of the catalyst coating in place of a direct ozone measurement to determine if the efficiency of the ozone depleting system has dropped to a threshold failure. In yet another sense, this invention constructs an OBD detector which senses and measures a physical characteristic or attribute of the catalyst coating to determine in the first instance, if a threshold failure has occurred and in the second instance, provide a clear demarcation when the ozone depletion system is nonfunctional.

The measurement of the physical characteristic of the catalyst coating can be had at any one of three locations as follows:

i) A "surrogate" off-radiator OBD detector module can be used. Surrogate detector module would have a catalyst coating on a metallic substance similar to that which the ozone depleting surface is applied to on the radiator, i.e., heat exchange fins 34 and be placed in the same path as the atmospheric air stream impinging the radiator but housed in a special enclosure that would protect it from the environmental elements that the radiator is exposed to. For example, the air flow directed past the surrogate catalyst can be channeled through a bend or several bends in the housing detector in the form of a chevron before passing over the catalyst coating thus preventing the OBD detector from being damaged by stones or bugs while allowing for proper positioning of any number of sensing devices determining the presence or certain physical characteristics or attributes of the catalyst coating. Depending on the surrogate location in the vehicle, a heater may necessarily be required in the surrogate housing to maintain the catalyst surface at proper temperature and for this reason, a surrogate OBD is not preferred. Alternatively, the surrogate may be located downstream of the heat exchanger and thus heated when the vehicle is in operation. On the other hand, a surrogate housing can be utilized to make the OBD ozone depletion sensor systems disclosed herein tamper proof.

ii) The radiator can be modified to include a housing resembling a surrogate housing but the housing is physically placed into the radiator in heat transfer relationship with radiator tubes 30 to avoid the necessity of an external heater. This arrangement is not preferred because it requires a modification of the radiator.

iii) Finally a portion of the heat exchange surface of the radiator can be simply sensed as shown in the preferred embodiments below. In theory, the entire heat exchange surface of the radiator can be monitored, but this is not necessary. It is sufficient if the radiator is monitored at the strategic positions noted above or at a single position if indicative of an "average" or representative position or area.

In accordance with a broader aspect of the invention, the actual OBD ozone conversion sensor employed to sense or measure a distinguishing physical characteristic or attribute of the catalyst coating can take the form of a) an electrical sensor, b) a magnetic sensor, c) an optical sensor or d) a thermal sensor.

a) The electrical sensor may take the form of a non-contact sensor. The non-contact sensor could include an eddy current sensor, an EMF sensor for sensing an induced AC voltage in the ozone catalyst or a capacitance or proximity sensor. Alternatively, the electrical sensor can take the form of a direct contact, electrical circuit sensor which has particular advantages when used as a sensor for an OBD ozone depletion system and comprise a specific inventive aspect of the present invention. The direct contact, electrical ozone depletion sensors are discussed in detail below in the preferred embodiment of the invention.

b) $MnO_2$ is paramagnetic and a very weak magnetic signal is exhibited in the ozone depleting catalyst coating. Conceptually ferromagnetic materials or permanent magnetic material can be added to the catalyst coating as a marker in the form of "seeds" or "tags" dispersed or embedded within the catalyst material to provide a detectable signal. Ferromagnetic materials can include elements such as Fe, Co, Ni or minerals such as magnetite, pyrrhotite, ilmenite can be employed. Permanent magnet materials including non-rare earth materials such as Alnico (Al—Ni—Co) or ceramic (Sr—Ba Ferrite) or rare earth materials such as Sm—Co or Nd—Fe—B or even plastic magnets could be used. The presence or absence of a magnetic field within the catalyst coating is sensed by a device such as a Hall effect sensor to determine a failure of the ozone depleting system.

c) It generally has been determined that light reflected from the catalyst coating is markedly different than light reflected from an uncoated aluminum radiator. This observation forms the basis for constructing a number of inventive OBD sensors using absorption/reflection and/or emissions/transmission characteristics of various light waves to determine whether or not the catalyst coating has ceased to function. Still further, changes in the intensity of signals measuring absorbed/reflected or emitted/transmitted light can be correlated to catalyst coating wear and aging and consequently the efficiency of the ozone depletion system determined. To enhance the ability to detect an optical signal, a marker or seed can be added in or on a catalyst coating to detect a specific light wavelength. Optical OBD sensors form a specific inventive aspect of the invention and are further described in the preferred embodiments of the invention below.

d) It is known that the catalyst itself, manganese dioxide, emits infrared radiation when the catalyst is effectively operated at slightly elevated temperatures. Accordingly, a detector sensing the presence of infrared radiation or heat can be utilized to determine the presence of the catalyst coating and thus determine whether or not the catalyst coating is functional. Alternatively, the catalyst formulation can be formulated with a thermochromic marker which will radiate specific wavelengths when the catalyst material is heated. Alternatively, an underlying material emitting a specific wavelength radiation when heated and masked or covered by the ozone depleting catalyst such as certain dyes, IR strip materials or silicone, can be applied as an initial coating on the heat exchange surface, i.e., radiator fin. When the catalyst coating is worn away, the radiation of the initial strip is detected to indicate a loss of the catalyst coating.

B3) Conversion Correlation and Functional Check or Measurement

Insofar as the inventive QBD ozone depletion sensing system is concerned, this invention recognizes that contaminant deposits will cause an ozone efficiency conversion drop of the catalyst coating to some set percentage; that any further decrease in efficiency conversion results from an abnormal wear pattern; that the wear pattern can be defined as heterogenous or homogenous or a combination thereof; that there are specific characteristics of the $MnO_2$ catalyst in the catalyst coating and that those specific characteristics can be detected, notwithstanding the presence of contaminant deposits, to detect the abnormal wear pattern and determine the catalyst functionality. In the sensor of the preferred embodiment disclosed below, the $MnO_2$ catalyst has been found to provide measurable distinctions (i.e., a brown/black color for the optical sensor and specific electrical conductivity characteristic for the electrical sensor) which are sufficient or which can be enhanced by the presence of markers (as defined later) or even generated by markers. Those sensors are particularly suited for OBD application because their sensitivity is satisfactory and they are robust and inexpensive. While the sensors can detect the normal threshold whereat the catalyst coating efficiency drops to some threshold, and thus determine if the abnormal wear occurs, importantly the sensors can also determine the presence or absence of the catalyst coating to determine if the system is functioning or not.

However, the invention in another sense, is the correlation resulting from the characteristics of the catalyst coating to asymptotically approach, with mileage accumulation, a set conversion efficiency threshold with a deviation therefrom attributed to catalyst wear which catalyst behavior and wear is attributed to a characteristic of the catalyst coating that can be physically sensed. In accordance with this aspect of the invention any type of sensor can be used to physically sense the catalyst characteristic which indirectly establishes the efficiency of the catalyst system. i.e., a chemical response reaction (efficiency) is correlated to a sensed physical property. The sensors mentioned in part B(2) are passive sensors in that the measurements are taken while the catalyst coating is normally functioning and without any interference in the normal aging and/or reaction function of the catalyst coating. Passive sensors form the preferred embodiment of this invention.

As noted throughout the specification, the $MnO_2$ catalyst in the catalyst coating has a somewhat distinguishing property of a limiting efficiency threshold independent of mileage accumulation when used in the vehicular environment described in detail herein. The methodology is believed applicable to other catalysts exhibiting similar behavior. These are catalysts (other than $MnO_2$) which are used in an environment whereat the catalyst will not normally or even abnormally experience a catalyst failure through chemical poisoning of the catalyst and in which the catalyst is exposed to a contact stream producing a catalyst reaction that, with aging, diminishes to some generally constant or steady state efficiency reaction (and not zero). Catalyst failure, functional or efficiency, can therefore be determined by abnormal wear of the catalyst in the coating resulting in coating loss.

C) Electrical Contact OBD Systems

The $MnO_2$ catalyst in catalyst coating 50 (FIG. 6A) has a high electrical resistance and a low electrical conductivity but is electrically conductive. Accordingly, an electrical circuit can be constructed which must physically pass through a portion of the catalyst coating to complete the circuit. Should catalyst coating 50 wear away, the circuit is open and electron flow ceases. Alternatively, a circuit can be constructed which passes through the electrically conductive radiator when the catalyst coating wears away. By measuring an electrical characteristic of the circuit-current, resistance and/or voltage—preferably voltage because of the low electrical conductivity of $MnO_2$, the absence of the $MnO_2$ catalyst can be detected.

Figure 7A:
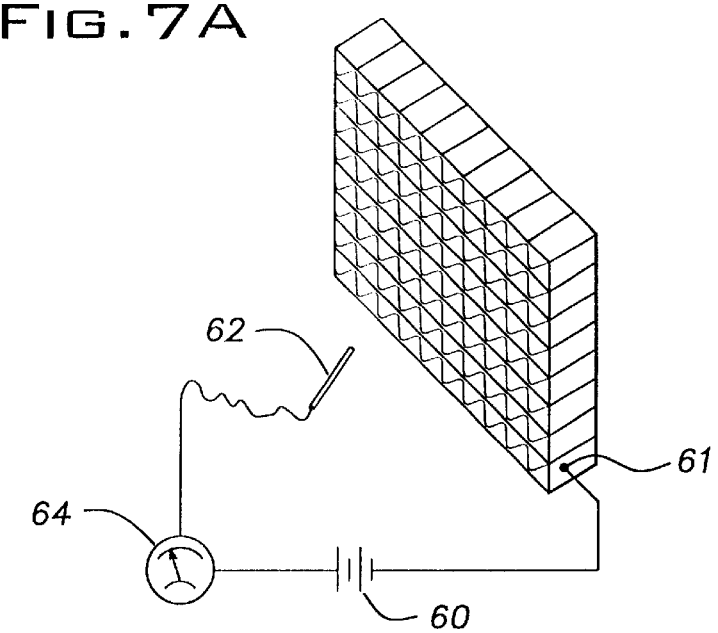
FIGS. 7A and 7B are pictorial representations of an electrical OBD sensor.

Datum demonstrating this concept was collected by an OBD electrical test circuit schematically illustrated in FIG. 7. Electrical circuit as shown comprises a power supply 60, i.e., a DC power supply in the form of a battery, with one of the terminals 61 of battery 60 (negative) connected to an uncoated portion of radiator 16 and with the other terminal of battery 60 (positive) connected to a probe 62 with a multimeter 64 inserted into the circuit for measurements. By contacting probe 62 at any coated fin (or tube) a closed circuit is established. Voltage readings measured by multimeter 64 for seven different fins with a fresh, unaged catalyst coating and with an aged catalyst coating is set forth in table 1 below. Table 1 datum was generated with a 9 volt power supply. As a point of reference, if there was no catalyst coating on the radiator, the voltage reading at multimeter 64 would be about 9.0 which is the output of the power supply.

TABLE 1

| FRESH COATED FIN ROWS | AGED COATED FIN ROWS |
|---|---|
| fin #1: 2.0 V | fin #1: 0.60 V |
| fin #2: 2.2 V | fin #2: 0.54 V |
| fin #3: 2.0 V | fin #3: 0.36 V |
| fin #4: 2.4 V | fin #4: 0.20 V |
| fin #5: 2.2 V | fin #5: 0.10 V |
| fin #6: 2.3 V | fin #6: 0.30 V |
| fin #7: 2.2 V | fin #7: 0.24 V |
| AVG. 2.2 V | AVG. 0.33 V |

Current flow record ed at ten different positions of the radiator vis-a-vis FIG. 7 for a fresh and aged coated catalyst is set forth in table 2 below. Table 2 datum was generated with a 5.1 volt power supply.

TABLE 2

| FRESH COATED RADIATOR | AGED COATED RADIATOR |
|---|---|
| PT. #1: 1.6 $\mu$a | PT. #1: 0.4 $\mu$a |
| PT. #2: 2.0 $\mu$a | PT. #2: 0.6 $\mu$a |
| PT. #3: 3.7 $\mu$a | PT. #3: 0.6 $\mu$a |
| PT. #4: 2.1 $\mu$a | PT. #4: 1.5 $\mu$a |
| PT. #5: 2.1 $\mu$a | PT. #5: 0.2 $\mu$a |
| PT. #6: 3.5 $\mu$a | PT. #6: 0.9 $\mu$a |
| PT. #7: 1.1 $\mu$a | PT. #7: 0.4 $\mu$a |
| PT. #8: 1.6 $\mu$a | PT. #8: 0.3 $\mu$a |
| PT. #9: 0.9 $\mu$a | PT. #9: 0.7 $\mu$a |
| PT. #10: 1.5 $\mu$a | PT. #10: 0.9 $\mu$a |
| AVG. 2.0 $\mu$a | AVG. 0.7 $\mu$a |
| S.D. 0.9 $\mu$a | S.D. 0.4 $\mu$a |

Tables one and two demonstrate that an electrical circuit passing through a portion of the catalyst coating can be established as a closed circuit with different electrical characteristics when the catalyst coating is fresh as compared to the catalyst coating when aged. Any number of electrical circuits can be constructed and the invention in its broadest sense encompasses all such circuits known to those skilled in the art. For example, probe 62 in FIG. 7 can be replaced with a spring bias contact which establishes electrical contact with the underlying aluminum fin row or tube if the catalyst coating wears away. In such event, a nonfunctioning ozone depletion system results and a significant increase in voltage would be observed. However, in accordance with a specific aspect of the invention, it is preferred that the electrical circuit be a circuit that opens when the catalyst coating wears away. As the catalyst coating wears (assuming a homogenous wear pattern as discussed with reference to FIGS. 5B and 6B), electron conductivity through the catalyst coating decreases and the decrease can be sensed to determine a catastrophic failure or a threshold failure.

Such a circuit can be readily constructed by imbedding an exposed lead from the power supply underneath the catalyst coating providing that the lead does not electrically contact the aluminum radiator, i.e, electrically isolated. Two ways that this can be accomplished in an inexpensive manner are illustrated in FIGS. 8A and 8B. In FIGS. 8A and 8B, that portion of the electrical lead connected to the power supply as shown with its insulation removed for drawing clarity so that only its electrical conductor 70 (typically an aluminum wire) is shown. In FIG. 8A, that portion of the electrical lead which extends underneath the catalyst coating is shown as an exposed section designated by reference numeral 71 and is characterized by having its insulation covering over the top portion of electrical conductor 70 removed so that only a bottom insulation portion 72 extends about the bottom portion of electrical conductor 70. Exposed portion 71 can extend the length of channel 33 (FIG. 3) or only a portion of the channel length. It is to be appreciated that electrical conductor 70 establishes a line contact in the electrically isolated exposed lead embodiment of FIG. 8A. Because the electrical OBD sensor is preferred to measure a homogenous catalyst coating wear pattern, it may be desirable to sense the catalyst coating wear over a coating area. In FIG. 8B, the insulation over the exposed portion of lead conductor 70 is stripped away and the bottom portion of electrical conductor 70 is glued to an insulating strip 74 which basically comprises the same type of insulation as originally shielding electrical conductor 70, i.e., any known ceramic or plastic or rubber insulation. As FIG. 8B has been described thus far, the exposed section 71 of lead 70 resembles the exposed section 71 of the lead shown in FIG. 8A except that the underlying insulation shown as 72 in FIG. 8A is in the form of an insulation strip 74. Over the exposed portion of electrical conductor 70 is a conductive strip 75 shaped similar to insulation strip 74. Conductive strip 75 is preferably of the same material as electrical conductor 70, i.e., aluminum. The sandwich construction of FIG. 8B is assembled and held in place by an appropriate adhesive able to withstand the operating temperatures of the radiator environment.

The exposed wire embodiment of FIG. 8A is ideally suited for application to ridge or groove 36 of the fin row corrugation as shown in FIG. 9A. This is a preferred position for sensing catalyst coating wear occurring at the apex 77 of the catalyst coating. As the apex of the catalyst coating wears, electrical conductivity will diminish until the catalyst coating wears away from exposed portion 71 at which point an open circuit will occur. The electrically isolated strip embodiment illustrated in FIG. 8B is preferably suited for application to radiator tube 30 as shown in FIG. 9B or to a single radiator fin 34 as shown in FIG. 9C. It is, of course, appreciated that the electrically isolated wire embodiment of FIG. 8A can also be applied to the radiator tube and fin row illustrated in FIGS. 9B and 9C.

Referring now to FIGS. 10A, 10B and 10C, there is shown various arrangements for mounting the electrically isolated wire embodiment of FIG. 8A in radiator channel 33. In its simplest form, an exposed isolated wire section 71 extends within a channel 33 and an electrical characteristic of the circuit, current or voltage, is sensed to determine wear of the catalyst coating. Table 3 below sets forth voltage and current measurements for FIG. 10A.

TABLE 3

|  | Voltage v* | Current $\mu$a |
|---|---|---|
| Thick Catalyst Coating (~40 $\mu$m) | 2.6 | 0.85 |
| Thin Catalyst Coating (~20 $\mu$m) | 1.5 | 0.19 |
| Very Thin Catalyst Coating (~10 $\mu$m) | 0.66 | 0.072 |

*Input voltage was 5.0 volts.

FIG. 10B illustrates the inclusion of several isolated, exposed wire sensors within a single channel having various lengths of exposed sections 71. This arrangement essentially places the isolated wires in series so that an average value indicative of the deterioration state of the channel is obtained. Alternatively, each of the exposed, isolated wire sections 71A, 71B, 71C can be sequentially switched into and out of the circuit as by switch 79.

A similar arrangement is disclosed in FIGS. 11A, 11B and 11C for the electrically isolated strip embodiment of FIG. 8B. Because electrically isolated strip section 75 extends over the fin row or tube area, FIG. 11B shows a plurality of isolated strip sections 75A, 75B and 75C in different channels 32A, 32B, 32C, respectively, with the strip channels connected in parallel within the electrical circuit shown. FIG. 11C shows that the channels can be switched into and out of the circuit for specific channel measurements. Parallel connection allows summing of the currents to give an average value more indicative of the overall functioning of the ozone depletion system because of the placement of the exposed isolated strip sections at strategic positions within radiator 16. It is also possible to similarly position a plurality of the isolated wire sections illustrated in FIGS. 10A–10C at a plurality of positions within the radiator and connect those sensors in parallel within the circuit.

As noted, any number of circuits may be constructed. However, preferred form of an OBD ozone depletion sensing circuit would preferably utilize a MOSFET (metal-oxide semi-conductor field effect transistor) to detect and switch a voltage sufficient to activate a warning light in the cab of a vehicle when the ozone depletion system is determined to have experienced a catastrophic failure or has been determined to simply no longer function. This applies to a material which like $MnO_2$ has a very high resistance (>10 megohms). Reference can be had to FIG. 12 for a schematic illustration of a fundamental OBD type circuit using a MOSFET 80 to trigger an alarm or warning light 82 when a threshold is sensed. When an electrical voltage is applied through the coating, then a very small current (micro range) passes through the coating which is not sufficient to turn on warning light 82. The MOSFET can function as a voltage-controlled gate that opens when the gate voltage is above a threshold which, in turn, can light bulb 82. More particularly, an adjustable gate resistance tuner 83 can be set to match a known coating resistance threshold (nonfunctional or threshold failure) at which a failure occurs to produce a gate voltage sufficient to switch the transistor to actuate bulb 82 in accordance with the following general equation.

$$V_{gate} = V_B \times R_{gate}/(R_{gate} + R_{coat})$$

where
 $V_{gate}$=minimum voltage required to turn on bulb 82
 $V_B$=battery output
 $R_{gate}$ is set at threshold
 $R_{coat}$ is the resistance of the catalyst coating as detected by the circuits of FIGS. 10 and 11 and inputted at 84

Figure 7B:
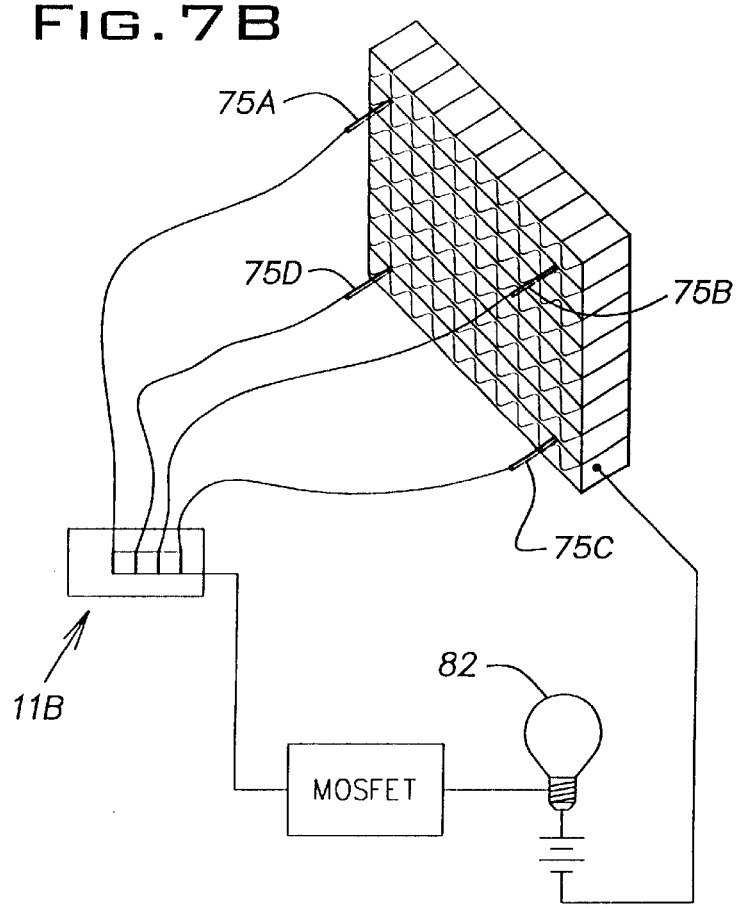

Reference can be had to FIG. 7B which diagrammatically shows the implementation of the Mosfet circuit illustrated in FIG. 12 in the conductive strip parallel circuit illustrated in FIG. 11B (or the circuit illustrated in FIG. 11C). In FIG. 7B conductive strips 75A, 75B, 75C, and 75D are strategically positioned at the corners of radiator 16 although other locations can be utilized i.e., corresponding to certification measurements. Also the sensor positions shown in FIG. 7B can be utilized by the optical sensors described in Section D hereof.

There are several additional points to note concerning the electrical sensor. Temperature does affect the sensor reading. Therefore, the preferred embodiment is to use the electrical OBD sensor at ambient temperature just as the vehicle is started, or as indicated in the preceeding discussion, a switch (not shown in FIG. 12) is provided in the electrical OBD circuit which will not activate the OBD ozone depletion detector system until the vehicle has reached normal operating temperature. On the other hand, an increase in temperature can remove moisture trapped at ambient temperature (which increases the resistance) from the pores of the HSA $MnO_2$ catalyst resulting in a resistance differential that can uniquely identify the coating and determine its presence on a radiator. Alternatively, a temperature look-up table has to be provided in the vehicle's ECU (engine control unit) and a corresponding adjustment made to gate resistor 83 which is not preferred. In addition to temperature, the switch may also be actuated by a moisture sensor present in the vehicle to prevent OBD sensing when the vehicle is driven in the rain and the catalyst coating is wet. Further, a plurality of electrical sensors are preferably placed at strategic locations in the radiator corresponding to the positions where ozone measurements are taken when the ozone depletion system is certified as discussed above. Additionally, a tag or tracer can be added to the catalyst coating formulation to increase the electrical conductivity of the catalyst coating such as but not limited to metals known to be electrically conductive and magnetic materials. While the $MnO_2$ catalyst exhibits a high resistance, in practice, it has not been found necessary to add markers to increase the electrical conductivity. The tabular values show a decrease in the electrical signals as the catalyst coating ages. Contaminants such as salts deposited on the catalyst coating during normal use are believed to contribute to the change of electrical conductivity detected by the electrical sensor discussed in FIGS. 8A and 8B. It is possible that a correlation exists between salt deposits and conversion efficiency of the catalyst coating at least up to a threshold failure as detected by the electrical sensor.

D) Optical Sensor OBD Systems

In concept, light or other forms of electromagnetic radiation can be absorbed or emitted by the catalyst coating and detection of the absence or presence of reflected or emitted radiation utilized to determine degradation or wear of the catalyst coating and hence the efficiency of the ozone depletion system and in the second instance the absence or presence of the catalyst coating on the radiator itself to determine if the ozone depletion system has ceased to function. More particularly, when the catalyst coating wears away, the aluminum heat exchange surface which is a silver colored metallic reflective surface is exposed (as contrasted to the catalyst coating which is a black oxide absorptive surface) producing easily distinguishable light signals to indicate a nonfunctional ozone depletion system. In a more subtle sense, contamination of the catalyst coating by foreign road matter contaminant phases interferes with a light signal otherwise produced or resulting from a "fresh" catalyst and the interference produces a degraded light sensor signal which could be utilized as an indication of deterioration of the efficiency of the ozone depleting surface attributed to road contamination. In a more specific sense, heterogeneous wear producing "salt and pepper" reflective surfaces on the catalyst coating have different reflective/absorption light characteristics than fresh catalyst coatings and can be utilized to determine a threshold failure.

Setting aside discussion of sensing radiation emitted by the catalyst coating at slightly elevated temperatures to determine the presence or absence or efficiency of the catalyst coating, the optical OBD ozone depletion sensor directs light against the catalyst coating and senses the incident light to determine in the first instance whether the catalyst coating is functioning at least at some set efficiency and/or in the second instance whether the catalyst coating is present or absent from the radiator surface exposed to the light. In the general sense of the invention, the light may be radiation at any frequency and may be coherent (same wavelength in phase) or collimated or focused or diffused or polarized and may be generated from light sources such as incandescent light bulbs, light emitting diodes (LED), lasers, strobes or other pulsed or modulated light sources. Detection of the incident light may be by inexpensive photodiodes, solar cells or photo resistors.

Figure 14A:
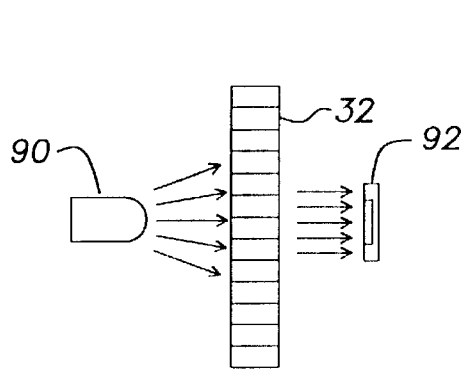
FIGS. 14A, 14B, 14C and 14D are schematic representations of relative positions of the sensor and detector for the optical OBD sensor of the present invention.
Figure 14B:
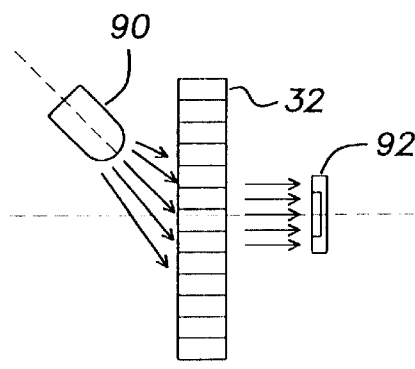
Figure 14C:
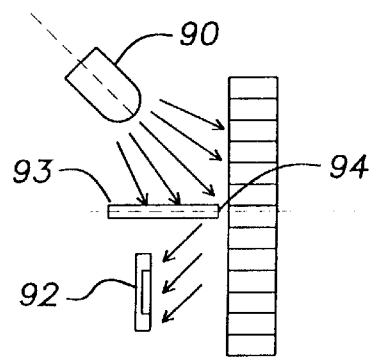
Figure 14D:
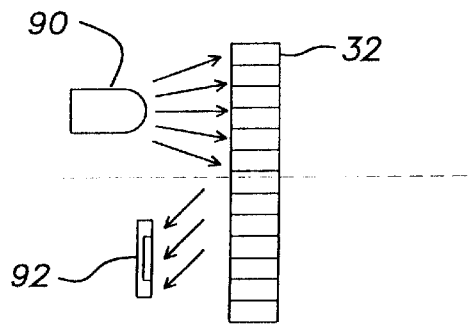

It is possible to transmit the light through the radiator channels as shown in FIGS. 14A and 14B or reflect the light at the face of the channels as shown in FIGS. 14C and 14D. Transmission can in theory be direct as shown in FIG. 14A in which a light source 90 directs coherent light through radiation channels 32 for detection by a light detector 92 on the opposite side. Only the light not striking the coated catalyst passes through the channel so that an increase in light intensity indicates reflection of light striking uncoated radiator surface when passing through the channel. In practice, reproducible signals have not been observed using laser light sources at various visible or near IR wavelengths. However, if the light source is offset at an angle to the channel and the light is collimated to strike the channel at an angle, referred to herein as "indirect transmission", the light is totally absorbed by the catalyst coating and detector 92 does not normally detect the transmitted light if the catalyst coating is present. Unfortunately, the use of lasers, collimator, lenses, mirrors, polarizers and/or filters increase the cost of the optical sensor.

In order to minimize cost, a system which senses the refection of diffused light from any conventional source as shown in FIGS. 14C and 14D may be utilized. The light is directed in a diffused manner against the face of the channels and any light reflected is sensed by a detector on the same side of the radiator as the light source. A number of channels covering a radiator surface area can be analyzed by sensing reflected light. In FIG. 14C the light source is directed at an angle to the channel length to assure that some portion of the light is reflected in the direction of detector 92. This arrangement is referred to herein as "forward diffuse reflection". To prevent the diffused light from source 90 directly entering detector 92, an opaque partition 93 with a slit 94 adjacent the radiation channel face (or a similar barrier) must be provided. To avoid the use of partition 93 it has been determined that if the light source is simply aligned with the channel, the natural diffusion of the light is sufficient to provide sufficient reflected radiation when the catalyst coating is not present to be detected by detector 92. This arrangement is referred to herein as "backward diffuse reflection". In backward diffuse reflection, light source 92 can be placed slightly behind or aligned with detector 92 and represents a preferred embodiment of the invention. It must also be noted that the orientation of the fin in the channel has an effect on the radiation detected by the detector in the reflection embodiment of the invention. As noted above, radiator 16 was described as having horizontal tubes 30. If the radiator has vertical tubes the orientation of the light source and detector may have to change (from that used in the horizontal tube arrangement) and the set detector ranges may be different.

Generally, the $MnO_2$ catalyst coating is porous and a brown/black color which absorbs electromagnetic radiation extending from the ultra-violet through the infra-red (IR) wavelength regions. The underlying silver colored aluminum fin row or tube (more specifically the underlying K—Al-fluoride brazing flux deposited on the aluminum surface) does not significantly absorb radiation at those wavelengths and reflects the radiation. Within this broad wavelength spectrum it has been determined that light at certain wavelengths can be readily absorbed by the $MnO_2$ catalyst coating. For example, coherent visible red light (wavelength of 0.65 to 0.70 $\mu$m) in an indirect transmission arrangement (FIG. 14B) exhibits excellent absorption characteristics by the catalyst coating. Unfortunately, red light exhibits excellent absorption characteristics in black paint. On the other hand, it has been determined that using far-infrared (far-IR) radiation in the narrow wavelength region of 17–20 $\mu$m, the $MnO_2$ catalyst coating can be readily differentiated from brazed aluminum flux by radiation in this specific absorption band. However, cost effective detectors are not available to detect radiation at that wavelength. Cost effective detectors can detect radiation in the near infrared region, i.e., wavelengths of approximately 0.8–2.5 $\mu$m. The $MnO_2$ catalyst coating is easily differentiable from brazed aluminum flux with light in this region (0.8–2.5 $\mu$m).

A "marker" may be applied by seeding or doping the catalyst coating or, alternatively, tagging the brazed aluminum flux surface with an organic or inorganic material that can withstand radiator operating temperatures to enhance the near IR signal. Specifically, the marker is a strong absorber of radiation in the red visible to the near-infrared to the low end of the mid-infrared region defined herein as wavelengths of 0.65–5 $\mu$m with a peak wavelength of 1 $\mu$m which will hereinafter be referred to as "near IR". Set forth in table 4 below is datum, taken from back diffuse reflector measurements of coated and uncoated radiators with black colored substances applied using a near IR LED light source and photodiode detection. Table 4 clearly shows that a light emitting diode transmitting light in the near IR region can distinguish black painted surfaces from the catalyst coating.

TABLE 4

| | PHOTODIODE DETECTOR VOLTAGE (Near IR LED Source) |
|---|---|
| HSA* $MnO_2$ | 0.34 |
| + Activated Carbon | 0.28 |
| + Carbon Black | 0.34 |
| + Black Paint | 0.88 |
| Uncoated | 1.80 |

*HSA - High surface area (100–300 m²/g)

Figure 13:
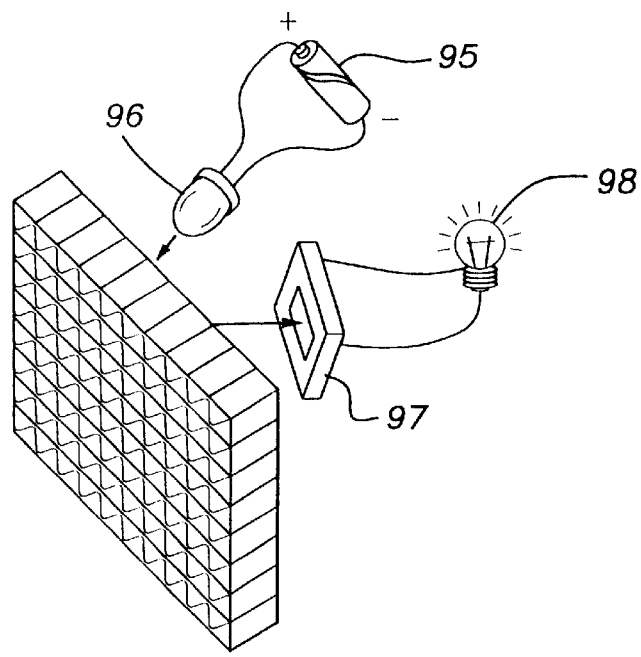
FIG. 13 is a pictorial representation of an optical OBD sensor of the present invention.

In the preferred embodiment of the invention which represents an inexpensive and durable selection of the choices noted above, the light is selected as visible light extending to the near infra-red region; the light source is preferably an LED (light emitting diode) generating diffused light; the sensor is an inexpensive photodiode and the components are placed in a backward diffuse reflection arrangement. The general arrangement is pictorially represented in FIG. 13. Essentially, a power supply 95 actuates a LED 96 and a photodiode 97 senses reflected radiation which at a set intensity level actuates a warning light 98 to the operator in the vehicle's cab. A number of modifications to the basic optical OBD ozone depletion sensing circuit pictorially represented in FIG. 13 are contemplated and are well known to those skilled in the art. LED 96 is preferably pulsed or modulated by a clock circuit (not shown) to provide a signature or fingerprint light signal permitting photodiode 93 to distinguish background radiation. The photodiode signal may be amplified to boost sensitivity and the diode signal transmitted through a band pass filter (i.e., low and high to detect an threshold failure limit and a nonfunctional limit) (not shown) or a comparator (not shown) to ascertain the occurrence of a failure at a set photodiode voltage.

Photodiode voltage signals using back diffuse reflection arrangement with radiator tubes 30 horizontal (A) and radiator tubes 30 oriented vertical (B) for radiators with and without a catalyst coating is set forth below in table 5. The light wavelength used to illuminate the radiator was in the near IR region.

TABLE 5

| COATED WITH $MnO_2$ | PHOTODIODE DETECTOR VOLTAGE (Near IR LED Source) | |
|---|---|---|
| | (A) | (B) |
| Fresh | 0.3 | 0.4 |
| Aged-Front Radiator Face | 0.5 | 0.7 |
| Aged-Back Radiator Face | 0.4 | 0.5 |
| UNCOATED | | |
| Fresh | 1.8 | 1.8 |
| Aged-Front Radiator Face | 0.7 | 0.9 |
| Aged-Back Radiator Face | 1.1 | 1.2 |

The data shows that when the catalyst coating is not present, a significant difference in photodiode signals occur. The data also shows that there is little difference in the optical signal for a fresh and aged sample. This is somewhat consistent with expected wear results since catalyst coating was fully present on the aged radiator tested. Note that the photodiode signal is less for the aged uncoated radiator than for a fresh uncoated radiator. The difference is attributed to contaminant deposits accumulation.

Photodiode responses were obtained for LEDs emitting various color (wavelengths) lights on coated and uncoated radiators and also on a plain strip of aluminum foil. Data is shown in table 6 below based on forward reflection measurements (FIG. 14C).

TABLE 6

Photodiode Detector Voltages for Different Light Sources on Different Surfaces

| Radiation | Uncoated Foil | Coated Foil | Painted Foil | Uncoated Radiator | Coated Radiator |
|---|---|---|---|---|---|
| Near IR | 7.3 | 0.72 | 1.4 | 3.7 | 0.20 |
| White | 2.3 | 0.15 | 0.14 | 0.72 | 0.09 |
| Red | 7.1 | 0.27 | 0.24 | 1.6 | 0.15 |
| Yellow | 2.1 | 0.04 | 0.05 | 0.29 | 0.03 |
| Blue | 0.37 | 0.008 | 0.01 | 0.06 | 0.003 |

Note that while the signal intensity is higher for the plain foil than the radiator channels, there is in both instances a significant difference in photodiode readings between an uncoated (bare) and a coated specimen. Also, the foil was painted with black paint and it can be seen there is a difference in distinguishing the black paint by the near IR wavelengths. It is also believed that light of different wavelengths may reflect differently on salts accumulated from contaminant deposits on the radiator and serve as efficiency measurements in ranges above a threshold failure.

While the preferred embodiment of the invention uses the optical sensor to determine the presence and absence of the catalyst coating on the radiator surface, the invention contemplates the addition of a marker which either i) makes the catalyst coating or the underlying substrate (radiator) reflective or absorptive of radiation at a set wavelength or ii) enhances the absorption or reflective signal of the catalyst coating or underlying substrate (radiator). Markers can take the form of seeds or tags physically within (doped) and formulated as part of the catalyst coating or be an absorptive or reflective strip placed between the substrate (radiator) and the catalyst coating or, conceptually, on top of the catalyst coating. Tags can take the form of powders, suspensions or solutions including light emitting phosphors, flourescent materials, inks, dyes and paint. Particles should typically be of a size about 0.3 $\mu$m and preferably not greater than about 1.0 $\mu$m. The strip, although a marker, is not a measurement of the activity of the catalyst coating but is a measure of whether the catalyst coating is or is not present and can detect or better detect a heterogeneous wear pattern as discussed above. In all instances, the marker provides a signature or fingerprint signal to the light detector.

A marker can be used to emit radiation when the catalyst coating is heated at a slightly elevated temperature at which the radiator is subjected, i.e., approximately 50° C. The emissions marker can take the form of a thermochromic material emitting (absorbing) radiation at set wavelengths such as black or blue at room temperature and bright red, pink or colorless at elevated temperatures. Alternatively, light phosphors or silicon powder which has a band gap of 1.17 EV and starts to absorb at 1.2 $\mu$m or liquid crystals can be used as tags, all of which are preferably not greater than about 1.0 $\mu$m when used as tags. This is in the near-IR region and can be used to detect the catalyst coating either by absorption (i.e., the near IR signals noted above) or emission. A possible marker material that is commercially used to make infrared detector strips contains a patch that absorbs the near-IR radiation given off by LEDs and laser sources. Such commercial near-IR strip is available from Tandy Corporation (infrared sensor, CAT. No. 276-1099) and absorbs near-IR radiation between 0.7 and 1.3 $\mu$m with a maximum at 1.0 $\mu$m. The material comprising the strip can be added to the $MnO_2$ catalyst coating formulation as a tag or seed or used in strip form. Emission radiation must use differentiation circuitry to distinguish background noise resulting from other surfaces inherently emitting radiation at elevated temperature. Test data in table 7 below take in a forward reflective arrangement shows that a thermochromic phosphor emits or fails to emit a reflective signal when a red or near IR light emitting diode is used to illuminate the radiator at ambient or operating temperatures.

TABLE 7

| | Photodiode Detector Voltage (Red LED Source) | | Photodiode Detector Voltage (Near IR LED Source) | |
|---|---|---|---|---|
| | 24° C. | 75° C.* | 24° C. | 75° C.* |
| AMBIENT ROOM LIGHT | 0.21 | 0.22 | 0.27 | 0.27 |
| UNCOATED RADIATOR | 3.6 | 3.4 | 1.8 | 1.8 |
| HSA MNO2 COATED RAD. | 0.33 | 0.32 | 0.32 | 0.32 |
| + BLUE PAINT | 0.37 | 0.33 | 0.82 | 0.80 |
| + THERMOCHROMIC BLUE | 1.1 | — | 1.1 | — |
| + THERMOCHROMIC PINK | — | 1.5–0.75 | — | 0.57 |

*Obtained using forced hot air.

It is also possible for example that the optical signal detected from the front face of the illuminated radiator section is different from the optical signal detected from the back face of the radiator. This is an expected result because the impinging air at the front face of the radiator is expected to produce more turbulence at the inlet end of the channel than at the exit end of the channel. The front face of the radiator is more likely to accumulate contaminant deposits and/or coating loss than the rear face. Accordingly, this invention includes the optional positioning of an optical sensor on the front face and an optical sensor on the back face of the radiator (generally longitudinally aligned with one another to preferentially sense the same radiator areas as the front and rear face) to monitor the differential effects of coating loss and/or contaminant deposition. When a higher photodiode detector voltage is detected on the front radiator face compared to the back face, then it suggests differential wear through the radiator, with more coating, for example, preferentially lost from the front of the radiator. (The reverse case with more coating lost from the back face would be very rare.) When equivalent signals are detected from the front and back faces, then, by interpolation, coating loss may be presumed to be uniform through the thickness of the radiator. In such arrangement the signals would be compared to one another to determine if they were within a set range of one another and depending on their difference, one of the signals or an average thereof is compared to a threshold range whereat ozone efficiency conversion. That is a variable threshold ozone conversion range can be established as a function of the difference between the signals

E) The Catalyst Composition

The present invention includes any compositions which can remove ozone from a gas containing the same. Such compositions include ozone catalyzing compositions, adsorbing compositions, absorbing compositions and the like. Among the most preferred catalytic materials are ozone catalyzing compositions which contain manganese dioxide as explained in detail below.

Ozone catalyzing compositions for use in the present invention comprise manganese compounds including manganese dioxide, non stoichiometric manganese dioxide (e.g., $XMnO_{(1.5-2.0)}$), and/or $XMn_2O_3$ wherein X is a metal ion, preferably an alkali metal or alkaline earth metal (e.g. sodium, potassium and barium). Variable amounts of water ($H_2O$, $OH^-$) can be incorporated in the structure as well. Preferred manganese dioxides, which are nominally referred to as $MnO_2$ have a chemical formula wherein the molar ratio of oxygen to manganese is about from 1.5 to 2.0. Up to 100 percent by weight of manganese dioxide $MnO_2$ can be used in catalyst compositions to treat ozone. Alternative compositions which are available comprise manganese dioxide and compounds such as copper oxide alone or copper oxide and alumina. Copper, however, is not preferred for an aluminum substrate.

Useful and preferred manganese dioxides are alpha-manganese dioxides nominally having a molar ratio of oxygen to manganese of from 1 to 2. Useful alpha manganese dioxides are disclosed in U.S. Pat. No. 5,340,562 to O'Young, et al.; also in O'Young, "Hydrothermal Synthesis of Manganese Oxides with Tunnel Structures", presented at the *Symposium on Advances in Zeolites and Pillared Clay Structures* presented before the Division of Petroleum Chemistry, Inc., American Chemical Society New York City Meeting, Aug. 25–30, 1991, beginning at page 342; and in McKenzie, "The Synthesis of Birnessite, Cryptomelane, and Some Other Oxides and Hydroxides of Manganese", *Mineralogical Magazine*, Dec. 5, 1971, Vol. 38, pp. 493–502. For the purposes of the present invention, the preferred alpha-manganese dioxide is selected from hollandite ($BaMn_8O_{16}.xH_2O$), cryptomelane ($KMn_8O_{16}.xH2O$), manjiroite ($NaMn_8O_{16}.xH_2O$) or coronadite ($PbMn_8O_{16}.xH_2O$). Other transition metal ions may be substituted with the alpha-manganese dioxide structure such as Fe, Co, Ni, Cu, Zn and Ag.

The manganese dioxides useful in the present invention may have a surface area as high as possible such as a surface area of at least 100 $m^2/g$. Those materials are referred to as high surface area (HSA) $MnO_2$. The composition preferably comprises polymeric binders. The composition can further comprise precious metal components or metals, including platinum group metals and oxides of palladium or platinum also referred to as palladium black or platinum black. The amount of palladium or platinum black can range from about 0 to 25%, with useful amounts being in ranges of from about 1 to 25 and from about 5 to 15% by weight based on the weight of the manganese component and the precious metal component.

It has been found that the use of compositions comprising the cryptomelane form of alpha manganese oxide, which also contain a polymeric binder can result in greater than 50%, preferably greater than 60% and typically from 75–85% conversion of ozone in a concentration range of up to 400 parts per billion (ppb).

The preferred cryptomelane can be made in accordance with methods described and incorporated into U.S. patent application Ser. No. 08/589,182 filed Jan. 19, 1996, incorporated herein by reference. The cryptomelane can be made by reacting a manganese salt including salts selected from the group consisting $MnCl_2$, $Mn(NO_3)_2$, $MnSO_4$, and Mn $(CH_3COO)_2$ with a permanganate compound. Cryptomelane is made using potassium permanganate; hollandite is made using barium permanganate; coronadite is made using lead permanganate; and manjiroite is made using sodium permanganate. It is recognized that the alpha-manganese dioxide useful in the present invention can contain one or more of hollandite, cryptomelane, manjiroite or coronadite compounds. Even when making cryptomelane minor amounts of other metal ions such as sodium may be present. Useful methods to form the alpha-manganese dioxide are described in the above references which are each incorporated herein by reference.

The preferred alpha-manganese dioxide for use in accordance with the present invention is cryptomelane. The preferred cryptomelane is "clean" or substantially free of inorganic anions, particularly on the surface. Such anions could include chlorides, sulfates and nitrates which are introduced during the method to form cryptomelane. An alternate method to make the clean cryptomelane is to react a manganese carboxylate, preferably manganese acetate, with potassium permanganate.

It is believed that the carboxylates are burned off during the calcination process. However, inorganic anions remain on the surface even during calcination. The inorganic anions such as sulfates can be washed away with the aqueous solution or a slightly acidic aqueous solution. Preferably the alpha manganese dioxide is a "clean" alpha manganese dioxide. The cryptomelane can be washed at from about 60° C. to 100° C. for about one-half hour to remove a significant amount of sulfate anions. The nitrate anions may be removed in a similar manner. The clean" alpha manganese dioxide is characterized as having an IR spectrum as disclosed in U.S. patent application Ser. No. 08/589,182 filed Jan. 19, 1996.

A preferred method of making cryptomelane useful in the present invention comprises mixing an aqueous acidic manganese salt solution with a potassium permanganate solution. The acidic manganese salt solution preferably has a pH of from 0.5 to 3.0 and can be made acidic using any common acid, preferably acetic acid at a concentration of from 0.5 to 5.0 normal and more preferably from 1.0 to 2.0 normal. The mixture forms a slurry which is stirred at a temperature range of from about 50° C. to 110° C. The slurry is filtered and the filtrate is dried at a temperature range of from about 75° C. to 200° C. The resulting cryptomelane crystals have a surface area of typically in the range of at least 100 m²/g.

Other ozone catalyzing compositions to remove ozone can comprise a manganese dioxide component and precious metal components such as platinum group metal components. While both components are catalytically active, the manganese dioxide can also support the precious metal component. The platinum group metal component preferably is a palladium and/or platinum component. The amount of platinum group metal compound preferably ranges from about 0.1 to about 10 weight percent (based on the weight of the platinum group metal) of the composition. Preferably, where platinum is present it is in amounts of from about 0.1 to 5 weight percent, with useful and preferred amounts of the catalyst composition volume, based on the volume of the supporting article, ranging from about 0.5 to about 70 g/ft³. The amount of palladium component preferably ranges from about 2 to about 10 weight percent of the composition, with useful and preferred amounts on the catalyst composition volume ranging from about 10 to about 250 g/ft³.

Various useful and preferred ozone catalyzing compositions, especially those containing a catalytically active component such as a precious metal catalytic component, can comprise a suitable support material such as a refractory oxide support. The preferred refractory oxide can be selected from the group consisting of silica, alumina, titania, ceria, zirconia and chromia, and mixtures thereof. More preferably, the support is at least one activated, high surface area compound selected from the group consisting of alumina, silica, titania, silica-alumina, silica zirconia, alumina silicates, alumina zirconia, alumina-chromia and alumina-ceria. The refractory oxide can be in suitable form including bulk particulate form typically having particle sizes ranging from about 0.1 to about 100 and preferably 1 to 10 µm or in sol form also having a particle size ranging from about 1 to about 50 and preferably about 1 to about 10 µm. A useful titania sol support comprises titania having a particle size ranging from about 1 to about 10, and typically from about 2 to 10 µm.

Also useful as a preferred support is a coprecipitate of a manganese oxide and zirconia. This composition can be made as recited in U.S. Pat. No. 5,283,041 incorporated herein by reference. Briefly, this coprecipitated support material preferably comprises in a ratio based on the weight of manganese and zirconium metals from 5:95 to 95:5; preferably 10:90 to 75:25; more preferably 10:90 to 50:50; and most preferably from 15:85 to 50:50. A useful and preferred embodiment comprises a Mn:Zr weight ratio of 20:80. U.S. Pat. No. 5,283,041 describes a preferred method to make a coprecipitate of a manganese oxide component and a zirconia component. As recited in U.S. Pat. No. 5,283,041 a zirconia oxide and manganese oxide material may be prepared by mixing aqueous solutions of suitable zirconium oxide precursors such as zirconium oxynitrate, zirconium acetate, zirconium oxychloride, or zirconium oxysulfate and a suitable manganese oxide precursor such as manganese nitrate, manganese acetate, manganese dichloride or manganese dibromide, adding a sufficient amount of a base such as ammonium hydroxide to obtain a pH of 8–9, filtering the resulting precipitate, washing with water, and drying at 450–500° C.

A useful support for the ozone catalyzing composition is selected from a refractory oxide support, preferably alumina and silica-alumina with a more preferred support being a silica-alumina support comprising from about 1% to 10% by weight of silica and from about 90% to 99% by weight of alumina.

Other useful catalysts to catalytically convert ozone to oxygen are described in U.S. Pat. Nos. 4,343,776 and 4,405,507, both hereby incorporated by reference. A useful and most preferred composition is disclosed in commonly assigned U.S. Pat. No. 5,422,331 hereby incorporated by reference. Yet other compositions which can result in the conversion of ozone to oxygen comprises carbon, and palladium or platinum supported on carbon, manganese dioxide, Carulite®, and/or hopcalite. Manganese supported on a refractory oxide such as recited above has also been found to be useful.

The catalyzed coating compositions as described above may be varied to include additional materials which provide a characteristic or attribute to the catalyzed coating to allow for, permit or enhance a signal used in the OBD detector as discussed above. The additional materials may be broadly divided into those materials which enhance, produce or import electrical characteristics or optical characteristics to the catalyst coating. Such additional materials may also be used as or incorporated in "overcoats" to protect the catalyst coating from contaminant deposition.

By way of example and not limitation the following markers discussed above and identified in the left hand column of Table 8 below may be added to the catalyst coating formulations described in this Section E by the process set forth in the right hand column of Table 8.

TABLE 8

| F) IMPLEMENTATION. | |
|---|---|
| Marker | Process |
| ABSORPTION DYE<br>Epolight IV-67<br>Epolin, Inc. (Newark, NJ) | The dry powder is dissolved in acetone. 0.1 wt % of the solution is then mixed with the commercial PremAir coating slurry. Dried at 100° C. |
| ACTIVATED CARBON<br>CarboChem SA-30 | (1) Slurry of 50 wt % dry powder mixed with water and 5% latex binder and applied directly onto surface of dry $MnO_2$ coating. Dried at 100° C.<br>OR<br>(2) 10% of dry powder added to commercial PremAir coating slurry. Dried at 100° C. |
| THERMOCHROMIC INK<br>ColorTell Thermochromic Ink Type 60AQI; Blue to Pink & Black to Pink & Black to Colorless<br>Clark R&D, Ltd. (Rolling Meadows, IL) | (1) Ink applied as is by brushing directly onto dry $MnO_2$ coating surface. Dried at 75° C.<br>OR<br>(2) Ink mixed with commercial PremAir coating slurry at 10 and 50 wt % levels. Dried at 100° C. |
| LIQUID CRYSTAL COATING<br>C17-10 Liquid Crystal Coating<br>Hallcrest, Inc., Glenview, IL | Liquid applied as thin layer to dry $MnO_2$ coating surface. Dried at 100° C. |

Figure 15:
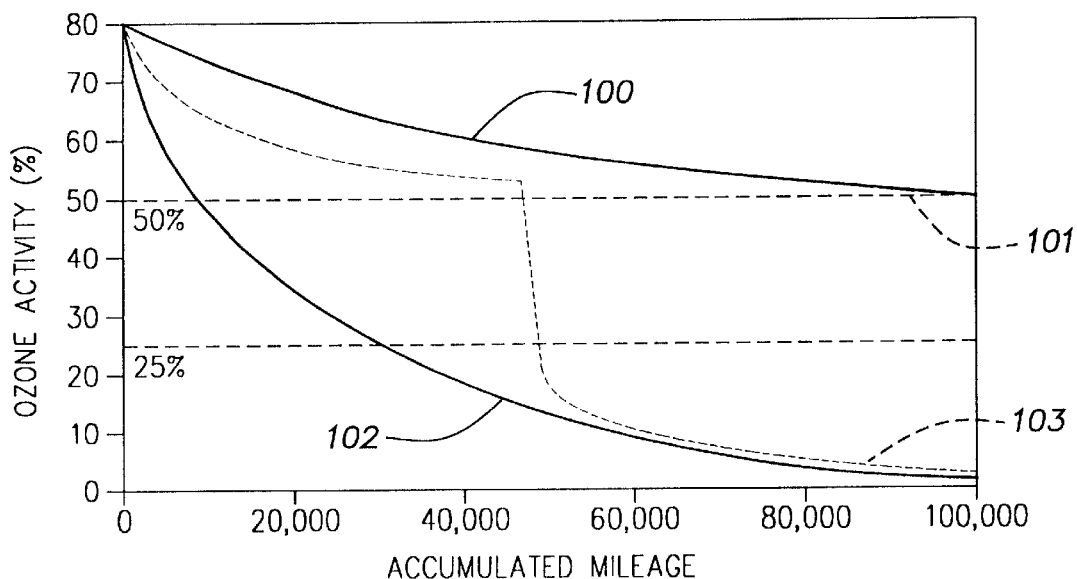
FIG. 15 is a graph of ozone depletion efficiency plotted as a function of mileage for catalyst coatings subject to normal wear, subjected to coating loss and subjected to abrupt failure.

Reference should now be had to FIG. 15. FIG. 15 shows by upper trace 100 the normal ozone depletion efficiency as a function of age of one formulation of catalyst coating to be placed on a radiator for one specific vehicle. The formulation is one of several making up band 40 depicted in FIG. 4. This catalyst coating formulation asymptotically approaches a set efficiency level or normal deactivation threshold which for illustration purposes is shown as 50% and is represented by graph line 101. As discussed above, assuming the catalyst coating remains intact, the asymptotic decrease in efficiency is attributed solely to contaminant deposits. The set threshold level 101 for any specific application for any specific catalyst coating formulation is not exceeded in the normal case of an aged catalyst coating. The only way the efficiency can drop below the set level is for a loss of catalyst coating to occur or the contaminant deposits to somehow exhibit a behavior that poisons or produces an abnormal degradation of the catalyst coating. A failure attributed to contaminant deposits is mentioned because it is theoretically possible to occur. It has not been observed and it is not known if the sensors disclosed herein can detect such a failure. The loss of catalyst coating is also an abnormal condition, but if it does occur, and occurs continuously, the ozone conversion efficiency will assume a shape such as that shown by lower trace 102 or if the coating loss occurs abruptly it will assume a shape such as shown by dot-trace 103. A condition of "failure" is said to occur if the ozone conversion efficiency falls below more than half of the normal deactivation threshold, in the sample shown, from 50% to 25%. A very sudden loss of catalytic activity resulting in a relative percentage reduction of the ozone conversion efficiency equal to or greater than about 50% of the normal deactivation limit is referred to as "catastrophic failure."

Catalyst coating loss (thinning and flaking) can occur by homogeneous or heterogeneous wear as described with reference to FIGS. 5 and 6. The electrical OBD sensor is ideally suited for discerning homogeneous wear or thinning of the catalyst coating. The optical OBD sensor is ideally suited for discerning heterogeneous wear of the catalyst coating in which flakes or particles of the catalyst coating (producing a "salt and pepper" pattern) erode the coating. Either sensor can clearly distinguish the presence and absence of the catalyst coating. This point may be illustrated by reference to FIG. 16 which discloses the signals from the optical sensor observed during aging of the catalyst coating and FIG. 17 which discloses the electrical responses of the electrical OBD sensor as the catalyst coating ages. Both sensors have clear responses when the catalyst coating is fresh indicated by the point designated by the reference numeral 105 and when the catalyst coating is no longer present indicated by reference numeral 106. Between these conditions, the sensors detect catalyst coating wear within the envelopes drawn by the dashed lines in which the upper portion of the envelope designated by reference numeral 108 may be viewed as indicative of sensor response attributed to coating loss of a fresh catalyst and the lower portion of the envelope designated by reference numeral 109 may be viewed as indicative of the sensor response of coating loss in an aged catalyst.

Figure 18:
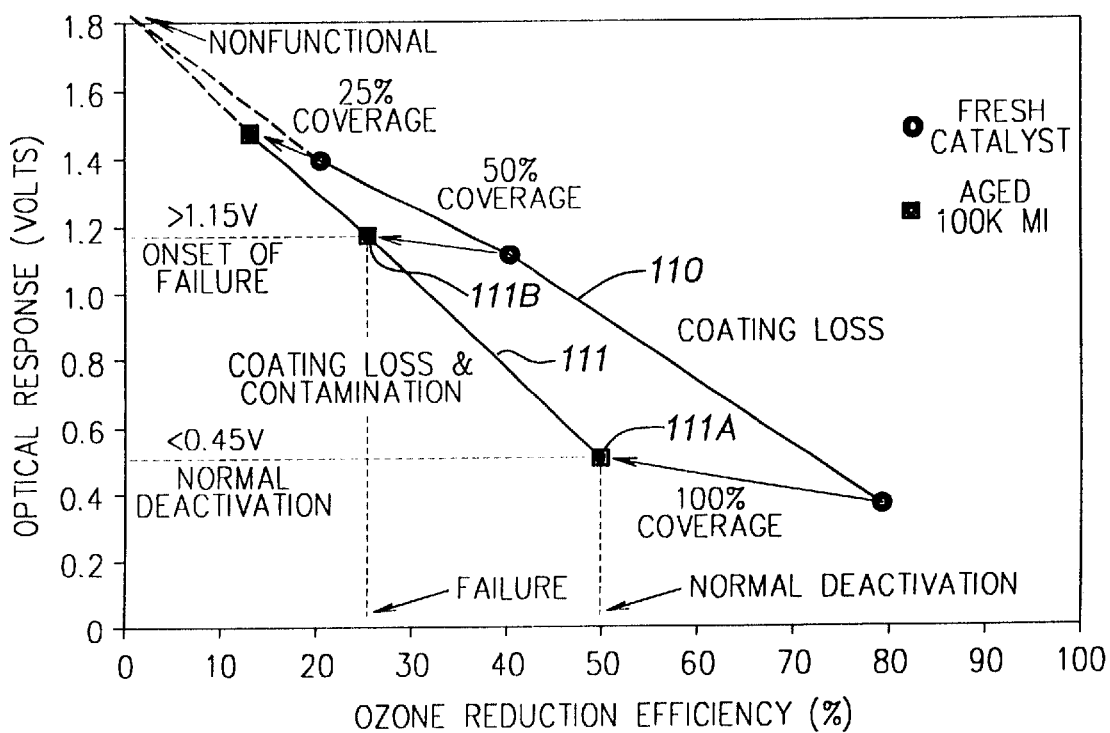
Figure 16:
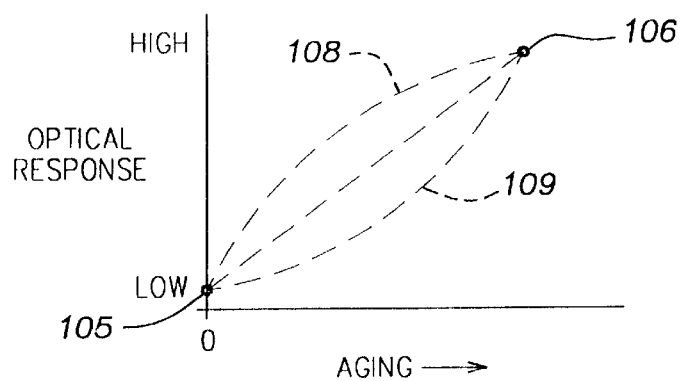
FIGS. 16 and 17 are graphs of optical and electrical OBD ozone depletion sensor responses, respectively, as the catalyst coating ages; and, FIG. 18 is a graph of optical OBD ozone depletion sensor responses as a function of wear.
Figure 17:
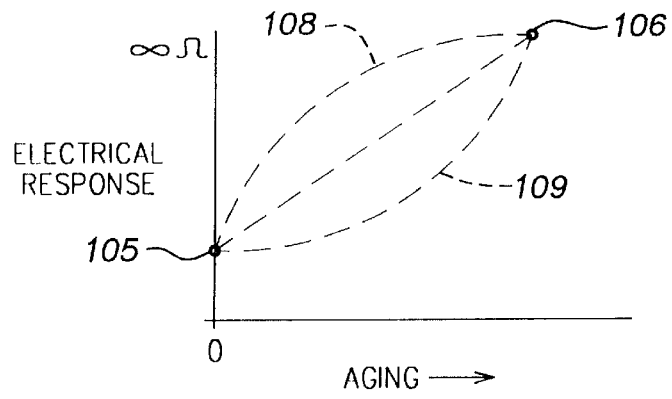

Correlating FIGS. 15 and 16, the optical sensor response related to ozone conversion efficiency can be established and is depicted in FIG. 18. In FIG. 18, the upper right trace passing through circles designated by reference numeral 110 is a fresh catalyst coating which had various percentages of the catalyst coating removed causing diminishing ozone depletion activity. Trace 110 is shown in FIG. 18 to demonstrate that it is possible to detect a coating loss of a fresh coating which causes the efficiency of the fresh catalyst coating to drop. The lower left trace passing through squares designated by reference numeral 111 is the efficiency of an aged catalyst coating which likewise had set percentages of its coating removed resulting in diminished ozone depletion activity and is the trace for setting the OBD sensors of the present invention. The set threshold of the catalyst coating which is normally not exceeded in an aged catalyst coating is shown by square designated 111A which for the specific formulation and application depicted is shown as a 50% conversion efficiency producing an optical sensor (photodiode) response of approximately 0.45 volts. Any greater signal indicates the threshold efficiency has been exceeded. Proposed regulations extend a credit if the sensor detects a drop in the normal conversion efficiency of an aged catalyst coating by 50% termed "normal deactivation threshold" indicating an onset failure. An onset failure indicating that a normal deactivation threshold is exceeded is shown in FIG. 18 as an optical sensor (photodiode) response of 1.15 volts or greater and is indicated by square designated by reference numeral 111B. A complete loss of catalyst coating indicating a nonfunctional catalyst coating is shown by the extension of trace 111 (and trace 110) which occurs when the optical sensor response reaches a value of about 1.8 volts. (This is the value for a fresh uncoated radiator. An aged uncoated radiator yields a slightly lower optical response of about 1.4 to 1.5 volts.)

An efficiency curve for the electrical OBD ozone depletion sensor, similar to that described for the optical OBD ozone depletion sensor shown in FIG. 18 can be constructed. As noted above, the OBD ozone depletion sensor system of the invention can include both electrical and optical OBD sensors and readings from both sensor types taken to determine if a normal deactivation threshold failure has occurred. That is, if either sensor indicated a normal deactivation threshold failure, the warning light within the vehicle cab would be actuated. It is also possible, as noted above, to place optical sensors on both front and rear faces of the radiator. While testing has not yet verified the concept, should either sensor indicate a normal deactivation failure (or a threshold failure) the readings from both sensors are compared. If both readings fall within a set range, it is known that the efficiency drop is attributed to catalyst coating wear. If outside the range, a different photodiode reading may be employed to determine if a normal deactivation failure has occurred.

The invention has been described with reference to preferred and alternative embodiments. Obviously, modifications and alterations will occur to those skilled in the art upon reading and understanding the Detailed Description of the Invention. It is intended to include all such modifications and alterations herein insofar as they come within the scope of the present invention.

Having thus defined the invention, it is claimed:

1. A method for determining if a vehicular ozone depletion system is functioning to remove ozone from atmospheric air, the ozone depletion system including a catalyst containing $MnO_2$ applied as a coating to a heat exchange surface in the vehicle over which atmospheric air passes, the method comprising the steps of:
   a) sensing the presence of the $MnO_2$ coating on the heat exchange surface and
   b) activating an alarm in the vehicle when the catalyst is no longer present on the heat exchange surface.

2. The method of claim 1 wherein the sensing step includes sensing physical characteristics of the catalyst coating selected from the group consisting of electrical conductivity, electromagnetic radiation absorption, electromagnetic radiation emission and electromagnetic radiation transmission.

3. The method of claim 2 wherein the sensing step detects a change in the sensed physical characteristic of the catalyst coating to determine the efficiency of the catalyst coating as well as the presence and absence of the catalyst coating on the heat exchange surface.

4. The method of claim 2 wherein the sensing step includes the steps of
providing an electrical power supply;
connecting the power supply to an electrical circuit extending through a portion of the catalyst coating to cause electrons to flow through a portion of the catalyst coating when the power supply is activated; and,
sensing a change in one or more circuit parameters selected from group consisting of voltage, resistance or current to determine when the catalyst coating is no longer present.

5. The method of claim 2 wherein the sensing step includes the steps of
providing a light source and a light detector adjacent to the radiator;
directing light from the light source against at least a portion of the radiator having the catalyst coating applied thereto when the radiator was new;
sensing the incident light by the light detector from the light source after it strikes the radiator;
determining if the intensity of the signal outputted from the light detector is within a given range which corresponds to the presence of the catalyst coating on the sensed portion of the radiator; and,
activating the alarm if the signal is within the range.

6. The method of claim 5 wherein the set range corresponds to a set efficiency percentage at which the catalyst coating removes ozone.

7. The method of claim 6 wherein the set range encompasses an efficiency reduction caused by a wear factor selected from the group consisting of i) a loss of catalyst coating on the radiator; ii) a poisoning of the catalyst coating by contaminant deposits; and, iii) a poisoning of the catalyst coating by contaminant deposits in combination with a loss of catalyst coating.

8. The method of claim 2 further including the step of adding a marker to the catalyst coating to enhance the sensed physical characteristics of the catalyst coating.

9. The method of claim 8 wherein the marker includes a tag added to and uniformly dispersed within the catalytic coating when formulating the catalytic coating.

10. The method of claim 9 wherein the tag includes particles not greater than about $1.0 \mu m$, at least one of which is selected from the group consisting of metals known to be electrically conductive and magnetic materials to enhance the electrical conductivity of the catalytic coating.

11. The method of claim 9 wherein the tag includes particles not greater than about $1.0 \mu m$, at least one of which is selected from the group consisting of light emitting phosphors, flourescent materials, inks, dyes and paint to enhance the radiation detection attributes of the catalyst coating.

12. The method of claim 9 wherein the tag includes particles not greater than about $1.0 \mu m$, at least one of which is selected from the group consisting of thermochromic inks, silicon and liquid crystal coatings which emit or absorb radiation when heated.

13. The method of claim 12 wherein the sensing step includes the steps of providing a radiation detector sensitive to the radiation emitted by the tag and actuating the alarm when the radiation detector fails to detect radiation emitted from the tag when the vehicle is at normal operating temperatures.

14. The method of claim 8 wherein the marker is an attribute enhancing strip, the method including the step of securing the attribute enhancing strip to the heat exchanger surface prior to depositing the catalyst coating on the heat exchanger surface and over the attribute enhancing strip and the sensing step senses the presence of the attribute of the attribute enhancing strip.

15. A method for determining when a catalyst coating containing $MnO_2$ applied as a thin layer to the fins of a vehicular radiator ceases to remove ozone from atmospheric air passing through the radiator during the life of the radiator, the method comprising the steps of:
a) providing a light source and a light detector adjacent to the radiator;
b) directing light from the light source against at least a portion of a given radiator section;
c) sensing the light from the light source after it strikes the given radiator section by the light detector;
d) determining from the intensity of the signal outputted by the light detector whether the light is incident upon the catalyst coating or the radiator section initially underlying the catalyst coating; and,
e) outputting a warning signal if the detector signal indicates the light is incident upon the radiator section initially underlying the catalyst.

16. The method of claim 15 wherein the light detector and the light source are positioned on opposite sides of the radiator.

17. The method of claim 16 wherein the light source produces coherent light and the light is directed at an angle to the length of the given radiator section.

18. The method of claim 15 wherein the light source and sensor are positioned on the same side of the radiator.

19. The method of claim 18 wherein the light from the light source is diffuse.

20. The method of claim 19 wherein the light is directed at an angle to the length of the radiator section.

21. The method of claim 15 wherein the light is visible to the near IR wavelength region.

22. The method of claim 21 further including the step of periodically pulsing the light source to generate readily detectable signature signals from the detector.

23. The method of claim 15 wherein the light source is selected from the group consisting of light bulbs, light emitting diodes, lasers, strobes and fiber optic devices.

24. The method of claim 15 wherein the light detector is selected from the group consisting of i) photodiodes; ii) solar cells; and iii) photoresistors.

25. The method of claim 15 further including the step of comparing the light detector signal to a set range indicative of a set change in the efficiency of the catalyst coating to remove ozone from atmospheric air passing through the radiator and outputting the warning signal when the light detector signal is within the set range.

26. The method of claim 25 wherein the set range corresponds to an ozone removal efficiency of approximately 50% or less and the set range accounts for wear of the catalyst coating attributed to a factor selected from the group consisting of i) removal of the catalyst coating, ii) poisoning of the catalyst coating by contaminant deposits and iii) removal of the catalyst coating and poisoning of the catalyst.

27. The method of claim 25 wherein the light from the light source has a visible to the near IR wavelength region and the method further includes the step of pulsing, in series, visible light at different wavelengths so that detection of reflected light at select wavelengths by the detector is indicative of the set range of the catalyst coating.

28. A method for determining when a catalyst coating containing $MnO_2$ applied as a thin layer to the fins of a vehicular radiator ceases to remove ozone from atmospheric air passing through the radiator during the life of the radiator, the method comprising the steps of
- providing an insulated conductor having insulation partially removed over an exposed section thereof so that the exposed section has insulation over a portion thereof while the conductor is exposed over the remaining portion of the exposed section;
- embedding the insulated conductor within the catalyst coating so that the conductor insulation is in contact with a radiator section and the exposed portion of the conductor section is embedded within and contacts only the catalyst coating;
- connecting an electrical power source between the insulated conductor and the radiator so that an electrical circuit extending from the power source through the electrical conductor and catalyst coating to the radiator exists; and,
- sensing the electrical circuit to determine when a set change in a circuit characteristic selected from the group consisting of i) voltage, ii) resistance, and iii) current occurs; and,
- outputting a warning signal when the set change has been sensed.

29. The method of claim 28 wherein the electrical conductor is positioned in the radiator at a position selected from the group consisting of i) at the curved portion of a corrugated aluminum strip forming fin rows, ii) at a flat surface of a fin row and iii) at the radiator tube between which the fin row extends.

30. The method of claim 29 wherein the conductor is a wire.

31. The method of claim 30 wherein the conductor is a metallic strip.

32. The method of claim 31 wherein the exposed section extends the length of the conductive strip within the row.

33. The method of claim 32 wherein a plurality of strips are embedded at one of the positions in a plurality of fin rows and each strip is connected in series in the electrical circuit so that the electrical characteristic of the catalyst coating being sensed is the sum of the electrical characteristics of the plurality of conductive strips.

34. The method of claim 33 wherein a plurality of strips are embedded at one of the positions in a plurality of fin rows and, the process further includes the step of individually switching each strip into and out of the electrical circuit in sequential relationship during the sensing step.

35. The method of claim 30 wherein the exposed section extends over an end portion of the wire.

36. The method of claim 35 further including the step of embedding a plurality of wires of different lengths within one position and connecting all wires to the power supply in series so that the electrical characteristics sensed is the sum of the electrical characteristics for all wires.

37. The method of claim 35 further including the step of embedding a plurality of wires of different lengths within one position and sequentially connecting each wire to the power source for the sensing step.

38. The method of any of the claims 35 to 37 further including the step of embedding the wire(s) at a plurality of different locations within the radiator.

39. The method of claim 29 wherein the insulator is selected from the group consisting of i) ceramic, ii) plastic, and iii) rubber.

40. A method for determining when a catalyst coating containing $MnO_2$ applied as a thin layer to the fins of a vehicular radiator ceases to effectively remove ozone from atmospheric air passing through the radiator during the life of the radiator, the method comprising the steps of:
- a) providing a light source and a light detector adjacent to a radiator face;
- b) directing light from the light source against at least a portion of a given radiator section;
- c) sensing the light from the light source after it strikes the given radiator section by the light detector;
- d) determining if the intensity of the signal outputted by the light detector is within a set range correlated to the efficiency at which the catalyst coating removes ozone; and,
- e) outputting a warning signal if the detector signal indicates the incident light signal is within the set range.

41. The method of claim 40 wherein the set range corresponds to the absence of the catalyst coating on the radiator section.

42. The method of claim 41 wherein the set range corresponds to a set efficiency percentage of ozone removal achieved by the catalyst coating.

43. The method of claim 42 further including the steps
- providing an electrical power supply;
- connecting the power supply to an electrical circuit extending through a portion of the catalyst coating to cause electrons to flow through a portion of the catalyst coating when the power supply is activated;
- sensing one or more circuit parameters selected from group consisting of voltage, resistance or current;
- comparing the sensed circuit parameter to a second set range; and,
- outputting the warning signal if the sensed circuit parameter is within the set range.

44. The method of claim 43 wherein the warning signal is sent only when both the incidence light signal is within the first set range and the electrical parameter signal is within the second set range.

45. The method of claim 40 further including the step of providing a second light source and detector adjacent to the radiator at a radiator face opposite to the radiator face whereat the first light source and detector are positioned, the first and second light sources and detector generally aligned with one another and setting the set efficiency range as a function of the difference between the signals from the first and second optical sensors.

46. A method for determining if an ozone depletion system is functioning to remove ozone from atmospheric air, the ozone depletion system including a catalyst containing $MnO_2$ applied as a coating to a heat exchange surface comprising the acts of:
- a) sensing a physical characteristic of the catalyst coating which is different than the heat exchange surface;
- b) comparing the sensed physical characteristic to a set threshold; and,
- c) activating a warning when the set threshold is exceeded.

47. The method of claim 46 wherein the set threshold is established as a function of the wear of the $MnO_2$ catalyst.

48. The method of claim 47 wherein the heat exchange surface is a portion of a vehicular radiator and the physical characteristic is selected from the group consisting of optical and electrical characteristics of the catalyst coating.

49. A method for determining the catalytic activity of a catalyst applied to a substrate over which a stream of fluid contacting the catalyst flows, the method comprising the steps of:
   a) providing a sensor for sensing electrical or light phenomena and generating signals indicative of a physical characteristic of the catalyst;
   b) setting a threshold against which the sensor signals are compared, the threshold indicative of the chemical conversion efficiency at which the catalyst reacts with the fluid stream when the catalyst normally ages to approach a steady state conversion efficiency;
   c) determining from the deviation between the sensor signal and the threshold signal when the sensor signal drops below the threshold signal the quantity of catalyst present on the substrate; and
   d) activating a warning when the quantity of catalyst present, as determined in step (c) drops below a set value.

50. The method of claim 49 wherein the catalyst is $MnO_2$ applied as a coating to a heat exchanger surface and the fluid is atmospheric air.

51. The method of claim 50 wherein the heat exchanger surface is a vehicular radiator.

52. The method of claim 51 wherein the sensor is an electrical sensor, the physical characteristic is moisture present in the catalyst of the coating and said method including the steps of sampling the sensor signals at different temperatures of the coating and comparing the signals at the different temperatures to measure resistance changes in the coating as moisture is released from the coating.

53. In a system for removing ozone from the atmosphere passing over a heated object in the engine compartment of a vehicle, the improvement comprising:
   a) an ozone depleting catalyst applied to said heated object so that a portion of said atmosphere passing through said engine compartment contacts said ozone removing catalyst;
   b) a sensor associated with said heated object for sensing a physical characteristic of said ozone removing catalyst, said physical characteristic selected from the group consisting of electrical conductivity, electromagnetic radiation absorption, electromagnetic radiation emission and electromagnetic radiation transmission; and,
   c) a warning indicator in said vehicle actuated when said sensor output deviates beyond a set limit whereby the ability of the ozone depleting catalyst to remove ozone from said atmosphere is established by sensing said physical characteristic of said ozone depleting catalyst.

54. The system of claim 53 wherein said physical property is said electrical conductivity and said system further includes a power supply, an electrical circuit extending through said ozone depletion catalyst and connected to said power supply and said sensor including a meter in said circuit measuring the electron flow in said circuit.

55. The system of claim 54 wherein said circuit measures the resistance of current to flow through said ozone depleting catalyst and includes a mosfet for triggering said warning indicator.

$$V_{gate}=V_B \times R_{gate}/(R_{gate}+R_{coat})$$

56. The system of claim 55 wherein said circuit includes an adjustable tuner set to a set resistance indicative of a failure of said ozone depleting catalyst, said mosfet effective to trigger said warning indicator according to the relationship:
where
   $V_{gate}$=minimum voltage required to actuate said warning indicator
   $V_B$=output of said power supply
   $R_{gate}$ is set at said set limit
   $R_{coat}$ is the resistance of said ozone depleting catalyst.

57. The system of claim 53 wherein said physical characteristic is electromagnetic radiation absorption, said system including a power supply, a light source connected to said power supply for directing incident radiation of a set wave length on said ozone depleting catalyst, a light detector for detecting reflected radiation and actuating said warning indicator when the intensity of said reflected radiation reaches a set value.

58. The system of claim 57 wherein said wavelength is at near infra-red frequency, said light source is an led and said light detector is a photodiode.

59. The system of claim 58 further including a plurality of tags dispensed within said ozone depleting catalyst not greater than 1 $\mu$m in size and selected from the group consisting of light emitting phosphors, flourescent materials, inks, dyes and paint.

60. The system of claim 53 wherein said physical characteristic is electromagnetic radiation transmission, said system further including a plurality of tags dispensed with said ozone depleting catalyst not greater than 1 $\mu$m in size and selected from the group consisting of thermochromic material emitting (absorbing) radiation at set wavelengths, light phosphors, silicon powder having a band gap of 1.17 EV and liquid crystals and a light detector eclectically connected to said warning indicator whereby said warning indicator is actuated when said light detector transmits a set signal.

61. The system of any of the claims 53 through 60 wherein said heated object in said engine compartment is a radiator in said vehicle, said radiator having fins and said ozone depleting catalyst applied to said fins; said ozone depleting catalyst including alpha-manganese dioxides having a molar ratio of oxygen to manganese of from 1 to 2 and a surface area on said fins of at least 100 $m^2/g$.

62. A system for removing ozone from atmosphere passing through a radiator having fins in a vehicle equipped with an internal combustion engine comprising:
   a) an ozone depleting catalyst applied to said radiator including alpha-manganese dioxides having a molar ratio of oxygen to manganese of from 1 to 2 and a surface area on said fins of at least 100 $m^2/g$;
   b) a sensor associated with said radiator measuring a physical characteristic of said ozone depleting catalyst selected from the group consisting of electrical conductivity, electromagnetic radiation absorption, electromagnetic radiation emission and electromagnetic radiation transmission; and,
   c) a warning indicator in said vehicle actuated when said sensor output deviates beyond a set limit whereby the ability of said ozone depleting catalyst to remove ozone from said atmosphere as said catalyst ages is established by sensing said physical characteristic of said ozone depleting catalyst.

63. The system of claim 62 wherein said physical property is said electrical conductivity and said system further includes a power supply, an electrical circuit extending through said ozone depletion catalyst and connected to said power supply and said sensor including a meter in said circuit measuring the electron flow in said circuit.

64. The system of claim 63 wherein said circuit measures the resistance of current to flow through said ozone depleting catalyst and includes a mosfet for triggering said warning indicator.

65. The system of claim 64 wherein said circuit includes an adjustable tuner set to a set resistance indicative of a failure of said ozone depleting catalyst, said mosfet effective to trigger said warning indicator according to the relationship:
where
- $V_{gate}$=minimum voltage required to actuate said warning indicator
- $V_B$=output of said power supply
- $R_{gate}$ is set at said set limit
- $R_{coat}$ is the resistance of said ozone depleting catalyst.

66. The system of claim 62 wherein said physical characteristic is electromagnetic radiation absorption, said system including a power supply, a light source connected to said power supply for directing incident radiation of a set wave length on said ozone depleting catalyst, a light detector for detecting reflected radiation and actuating said warning indicator when the intensity of said reflected radiation reaches a set value.

67. The system of claim 66 wherein said wavelength is at near infra-red frequency, said light source is an led and said light detector is a photodiode.

68. The system of claim 67 further including a plurality of tags dispensed within said ozone depleting catalyst not greater than 1 $\mu$m in size and selected from the group consisting of light emitting phosphors, flourescent materials, inks, dyes and paint.

69. The system of claim 62 wherein said physical characteristic is electromagnetic radiation transmission, said system further including a plurality of tags dispensed with said ozone depleting catalyst not greater than 1 $\mu$m in size and selected from the group consisting of thermochromic material emitting (absorbing) radiation at set wavelengths, light phosphors, silicon powder having a band gap of 1.17 EV and liquid crystals and a light detector eclectically connected to said warning indicator whereby said warning indicator is actuated when said light detector transmits a set signal.

$$V_{gate}=V_B \times R_{gate}/(R_{gate}+R_{coat})$$

* * * * *